United States Patent [19]

Katayose et al.

[11] Patent Number: 5,218,030
[45] Date of Patent: Jun. 8, 1993

[54] CURABLE POLYPHENYLENE ETHER RESIN COMPOSITION AND A CURED RESIN COMPOSITION OBTAINABLE THEREFROM

[75] Inventors: Teruo Katayose, Sakura; Hiroji Oda; Haruhisa Sasaki, both of Kawasaki, all of Japan

[73] Assignee: Asahi Kasei Kogyo Kabushiki Kaisha, Osaka, Japan

[21] Appl. No.: 476,916

[22] Filed: Feb. 7, 1990

[30] Foreign Application Priority Data

| Feb. 8, 1989 | [JP] | Japan | 1-27556 |
| Mar. 7, 1989 | [JP] | Japan | 1-53004 |
| Mar. 8, 1989 | [JP] | Japan | 1-53938 |
| Mar. 8, 1989 | [JP] | Japan | 1-53939 |

[51] Int. Cl.$^5$ .......................... C08K 5/06; C08L 71/12
[52] U.S. Cl. .................... 524/371; 428/422.8; 524/24; 524/35; 524/151; 524/409; 524/513; 524/514; 524/524; 525/151; 525/391; 525/905
[58] Field of Search .............. 525/391, 905, 351, 151; 524/115, 151, 27, 35, 371, 409, 513, 514, 524

[56] References Cited

U.S. PATENT DOCUMENTS

| 3,422,062 | 1/1969 | Segal et al. | 260/47 |
| 3,637,578 | 1/1972 | Wright et al. | 525/46 |
| 3,936,414 | 2/1976 | Wright et al. | 525/44 |
| 4,034,136 | 7/1977 | Wright et al. | |

FOREIGN PATENT DOCUMENTS

| 0129762 | 1/1985 | European Pat. Off. . |
| 0309025 | 3/1988 | European Pat. Off. . |
| 2140685 | 1/1973 | France . |
| 58-69052 | 4/1983 | Japan . |
| 61-287739 | 12/1986 | Japan . |
| 2148512 | 7/1987 | Japan .................. 525/391 |
| 64-3223 | 1/1989 | Japan . |
| 1-16409 | 3/1989 | Japan . |
| 1-16410 | 3/1989 | Japan . |
| 1-17492 | 3/1989 | Japan . |
| 2020296A | 11/1979 | United Kingdom . |
| 2172892A | 10/1988 | United Kingdom . |

OTHER PUBLICATIONS

English-language Abstract of Japanese Patent Appln. No. 1-17492.
English-language Abstract of Japanese Patent Appln. No. 1-16410.
English-language Abstract of Japanese Patent Appln. No. 1-16409.

Primary Examiner—Jacob Ziegler
Attorney, Agent, or Firm—Armstrong, Westerman, Hattori, McLeland & Naughton

[57] ABSTRACT

A novel curable polyphenylene ether resin composition is disclosed, which comprises (a) a curable polyphenylene ether resin having at least one group selected from the group consisting of an allyl group and a propargyl group and (b) at least one cyanurate. The resin composition has excellent storage stability, film-forming properties and melt moldability. If desired, a fire retardant, optionally together with an antimony-containing auxiliary fire retardant, and/or a reinforcement is incorporated into the resin composition in order to improve the fire retardance and mechanical properties of the resin composition, respectively. By curing the resin composition, a cured polyphenylene ether resin composition comprising a chloroform nonextractable polyphenylene ether resin component and a chloroform extractable, polyphenylene ether-containing component is obtained, which has excellent chemical resistance, electrical properties, dimensional stability and heat resistance. A laminate or composite structure comprising the cured polyphenylene ether resin composition and a metallic foil and/or a metallic substrate provides advantageous mechanical and electronic components.

6 Claims, No Drawings

CURABLE POLYPHENYLENE ETHER RESIN COMPOSITION AND A CURED RESIN COMPOSITION OBTAINABLE THEREFROM

BACKGROUND OF THE INVENTION

1. Field Of The Invention

The present invention relates to a curable polyphenylene ether resin composition, a cured polyphenylene ether resin composition, a laminate structure and a composite structure. More particularly, the present invention is concerned with a curable polyphenylene ether resin composition comprising a curable polyphenylene ether resin having at least one group selected from the group consisting of an allyl group and a propargyl group, and at least one cyanurate. Also, it is concerned with a cured polyphenylene ether resin composition comprising a chloroform nonextractable polyphenylene ether resin component and a chloroform extractable, polyphenylene ether-containing component obtained by curing the above-mentioned curable polyphenylene ether resin composition. Further, it is concerned with a laminate structure comprising a metallic foil and at least one cured resin composition layer disposed on at least one surface of said metallic foil, and a composite structure comprising a metallic substrate and at least one cured resin composition layer disposed on at least one surface of the metallic substrate.

The curable polyphenylene ether resin composition of the present invention has excellent storage stability, film forming properties and melt moldability, and the cured polyphenylene ether resin composition of the present invention has excellent chemical resistance, electrical properties (such as low dielectric constant and low dielectric dissipation factor), fire retardance, dimensional stability and heat resistance. Accordingly, the cured polyphenylene ether resin composition can advantageously be used as a dielectric material, an insulating material, a heat resistant material and the like in, for example, electrical and electronic industries, space and aircraft industries, etc.

The laminate structure and composite structure of the present invention can advantageously be used as a single-sided printed circuit board, a double-sided printed circuit board, a multi-layer printed circuit board, a flexible printed circuit board and the like.

2. Discussion Of Related Art

In recent years, miniaturization and high-packing-density mounting have been strongly desired in the field of electronic devices for communication, household, industries and the like. Accordingly, materials for such devices having excellent heat resistance, dimensional stability and electrical properties have been strongly desired in the art. For example, a copper-clad laminate made of a substrate comprising a thermosetting resin, such as a phenol resin and an epoxy resin, has been used as a printed circuit board. However, such a thermosetting resin has a drawback in that the resin has undesirable electrical properties, particularly an undesirably high dielectric constant in a high frequency range, although the resin has a good balance of various properties.

For overcoming the above-mentioned drawback, polyphenylene ether has been attracting attention as a new material, and it has been attempted to apply a polyphenylene ether to a copper-clad laminate. Indeed, a polyphenylene ether is one of the typical engineering plastics which has not only excellent mechanical but also desired electrical properties, such as a low dielectric constant and a low dielectric dissipation factor, and has also a relatively good heat resistance. However, when a polyphenylene ether is used as a material for a printed circuit board substrate, the heat resistance thereof is insufficient. A material for a printed circuit board substrate is required to have an extremely high heat resistance, because a printed circuit board substrate is necessarily exposed to high temperatures in soldering. However, substrates made of conventional polyphenylene ethers are likely to undergo distortion at temperatures higher than about 200° C., thereby causing a considerable decrease in mechanical properties and peeling off of copper foils provided as circuits on the surface of the substrate. A polyphenylene ether has also another drawback in that it has such poor resistance to an aromatic hydrocarbon and a hydrocarbon substituted with a halogen atom that it is ultimately dissolved in such hydrocarbons, although the polyphenylene ether has excellent resistance to acids, alkalis and hot water.

For improving the heat resistance and chemical resistance of a polyphenylene ether, various proposals have been made, in which a polyphenylene ether is formulated into a composition. For example, Japanese Patent Application Laid-Open Specification No. 61-287739 discloses a composite structure comprising as a resin substrate a cured resin obtained by curing a resin composition comprising a polyphenylene ether and at least one member selected from the group consisting of triallyl cyanurate and triallyl isocyanurate. The cured resin has poor chemical resistance, e.g., poor resistance to boiling trichloroethylene, and poor fire retardance, so that the composite structure is not suited for use as a printed circuit board. In a method comprising preparing a solution of the resin composition and fabricating the solution into a film according to a casting method, the resin composition solution has poor film-forming properties, so that disadvantageously it is difficult to obtain a film with a smooth surface. This reference does not teach or suggest a polyphenylene ether having an ethylenically or acetylenically unsaturated group, such as an allyl group or a propargyl group, which can provide, in cooperation with a triallyl cyanurate or isocyanurate, an advantageous curable polyphenylene ether resin composition as described below in the present invention.

U.S. Pat. No. 3,557,045 discloses a thermosetting resin composition comprising (a) 5 to 95% by weight of a polymerizable material containing carbon-carbon double bonds, at least 5% of which is a liquid monomer, (b) 95 to 5% by weight of a polyphenylene ether resin, and (c) a radical initiator. In particular, the patent discloses a composition comprising a diallyl phthalate monomer, a diallyl phthalate prepolymer, a polyphenylene ether resin and a radical initiator, which composition is described as having improved electrical and mechanical properties. This composition, however, has poor chemical resistance. In the patent, there is no description teaching or suggesting a composition comprising a polyphenylene ether and triallyl cyanurate or triallyl isocyanurate as described below.

U.S. Pat. No. 3,637,578 discloses a thermosetting resin composition comprising (a) 10 to 95% by weight of a mixture of a liquid monomer containing carbon-carbon double bonds in an amount of at least 5% and having a boiling point of 70° C. or higher with a reactive polyester resin, (b) 5 to 90% by weight of a polyphenylene ether resin and (c) a radical initiator. It is described that the thermosetting resin composition can be cured to obtain a thermoset resin having improved electrical and mechanical properties. In Examples 3-2 and 3-4, a composition comprising a polyphenylene ether resin, a polyester resin, triallyl cyanurate and diallyl phthalate is disclosed. The polyphenylene ether resin content of the composition is 20%, with the balance of 80% being comprised of crosslinkable components (i.e., polyester resin, triallyl cyanurate and diallyl phthalate). However, the chemical resistance of this thermoset resin is not sufficient. This reference does not teach or suggest a polyphenylene ether having an ethylenically or acetylenically unsaturated group, such as an allyl group or a propargyl group, which can provide in cooperation with triallyl cyanurate or isocyanurate, an advantageous curable polyphenylene ether resin composition as described below in the present invention.

U.S. Pat. No. 3,936,414 discloses a thermosetting composition comprising (a) 10 to 50 parts by weight of a polyunsaturated monomer, (b) 5 to 30 parts by weight of a polychlorinated or polybrominated aromatic hydrocarbon having a molecular weight of at least 200 and a chlorine or bromine content of at least 50% by weight, (c) 20 to 60 parts by weight of a polyphenylene ether, (d) 0 to 30 parts by weight of a polyunsaturated polymer having unsaturated carbon-carbon bonds and (e) 2 to 10 parts by weight, per 100 parts by weight of components (a)+(b)+(c)+(d), of a peroxide. Examples of polyunsaturated monomers (a) include triallyl cyanurate and triallyl isocyanurate. However, the chemical resistance of this composition is not satisfactory, so that the practical use of the composition is limited. This reference does not teach or suggest a polyphenylene ether having an ethylenically or acetylenically unsaturated group, such as an allyl group or a propargyl group, which can provide, in cooperation with triallyl cyanurate or isocyanurate, an advantageous curable polyphenylene ether resin composition as described below.

On the other hand, with respect to general-purpose printed circuit boards comprising a glass fiber-reinforced epoxy resin substrate, various proposals have also been made to improve the heat resistance and electrical properties thereof. For example, it was proposed to improve the heat resistance and electrical properties of such printed circuit boards by employing a resin blend comprising a polyphenylene ether and an epoxy resin. In this connection, reference is made to Japanese Patent Application Laid-Open Specification No. 58-69052/1983 and Japanese Patent Application Publication No. 64-3223/1989, in which a composite structure comprising a resin layer comprised of a polyphenylene ether and an epoxy resin and a glass fabric is disclosed. The chemical resistance of the resin layer of the composite structure is not satisfactory, and hence the composite structure is not suitable for use as a printed circuit board.

SUMMARY OF THE INVENTION

With a view toward developing a polyphenylene ether resin composition simultaneously satisfying various property requirements, such as excellent chemical resistance, electrical properties (such as low dielectric constant and low dielectric dissipation factor), fire retardance, dimensional stability and heat resistance, the present inventors have made extensive and intensive studies. As a result, they have unexpectedly found that a curable polyphenylene ether resin composition comprising a curable polyphenylene ether resin having at least one group selected from the group consisting of an allyl group and a propargyl group and at least one cyanurate selected from the group consisting of triallyl cyanurate and triallyl isocyanurate has excellent storage stability, film-forming properties and melt moldability, and that by curing the curable polyphenylene ether resin composition, a cured polyphenylene ether resin composition having excellent chemical resistance, electrical properties, dimensional stability and heat resistance can be obtained. Also, the present inventors have found that the fire retardance and mechanical properties of the polyphenylene ether resin composition are improved, without sacrificing the above-mentioned excellent properties of the composition, by incorporating into the composition a fire retardant and a reinforcement, respectively. Based on these novel findings, the present invention has been completed.

It is, therefore, an object of the present invention to provide a curable polyphenylene ether resin composition having excellent storage stability, film-forming properties and melt moldability, which can readily be cured.

It is another object of the present invention to provide a cured polyphenylene ether resin composition having excellent chemical resistance, electrical properties (such as low dielectric constant and low dielectric dissipation factor), fire retardance, dimensional stability and heat resistance, which can advantageously be used as a dielectric material, an insulating material, a heat resistant material and the like in, for example, the electrical and electronic industries, space and aircraft industries, etc.

It is a further object of the present invention to provide a laminate or composite structure comprising a metallic foil and/or substrate and at least one layer of the cured polyphenylene ether resin composition, which can advantageously be used as a single-sided printed circuit board, a double-sided printed circuit board, a multi-layer printed circuit board, a flexible printed circuit board and the like.

The foregoing and other objects, features and advantages of the present invention will be apparent to those skilled in the art from the following detailed description and appended claims.

DETAILED DESCRIPTION OF THE INVENTION

In one aspect of the present invention, there is provided a curable polyphenylene ether resin composition comprising: (a) 98 to 40% by weight, based on the total weight of components (a) and (b), of a curable polyphenylene ether resin comprising at least one polyphenylene ether represented by the formula:

(I)

wherein m is an integer of 1 or 2, J is a polyphenylene ether chain comprising units of the formula:

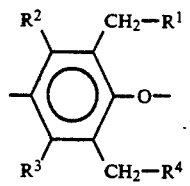
(II)

wherein $R^1$, $R^2$, $R^3$ and $R^4$ each independently represent a hydrogen atom, an allyl group or a propargyl group, at least one of $R^1$, $R^2$, $R^3$, and $R^4$ being other than hydrogen, and Q' represents a hydrogen atom when m is 1, and Q' in each polyphenylene ether independently represents Q or Q substituted with at least one substituent selected from the group consisting of an allyl group and a propargyl group when m is 2, where Q is the residue of a bifunctional phenol having 2 phenolic hydroxyl groups and having unpolymerizable substituents at the ortho and para positions with respect to the phenolic hydroxyl groups, with the proviso that each polyphenylene ether chain is the same or different when m is 2 and that said units of formula (II) are the same or different, the curable polyphenylene ether resin having an average substitution degree of allyl and propargyl groups of from 0.1 to 100% by mole as defined by the formula:

$$\frac{\text{total number of moles of allyl and propargyl groups in the polyphenylene ether resin}}{\text{number of moles of phenyl groups in the polyphenylene ether resin}} \times 100(\%);$$

(b) 2 to 60% by weight, based on the total weight of components (a) and (b), of at least one cyanurate selected from the group consisting of triallyl isocyanurate and triallyl cyanurate;

(c) 0 to 50% by weight, based on the total weight of components (a) and (b), of a fire retardant selected from the group consisting of a phosphorus-containing fire retardant, a chlorine-containing fire retardant and a bromine-containing fire retardant;

(d) 0 to 50% by weight, based on the total weight of components (a) and (b), of an antimony-containing auxiliary fire retardant; and (e) 0 to 90% by weight, based on the total weight of components (a), (b), (c), (d) and (e), of a reinforcement.

Representative examples of Q include residues represented by the following formulae (III-a) and (III-b):

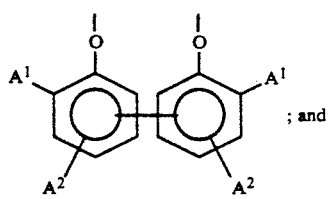
(III-a)

; and

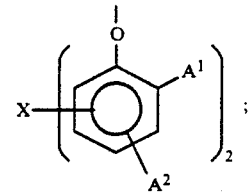
(III-b)

wherein $A^1$ and $A^2$ each independently represent a straight chain alkyl group having 1 to 4 carbon atoms; X represents an unsubstituted or substituted aliphatic hydrocarbon group, an unsubstituted or substituted aromatic hydrocarbon group, an unsubstituted or substituted aralkyl group, an oxygen atom, a sulfur atom, a sulfonyl group or a carbonyl group; and the line representing a bond which crosses the middle point of a side of the benzene ring, as shown for example in

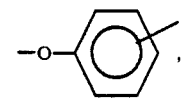

indicates bonding of a substituent at the ortho or para position of the benzene ring with respect to the phenolic hydroxyl group.

Specific examples of Q include residues represented by the following formulae:

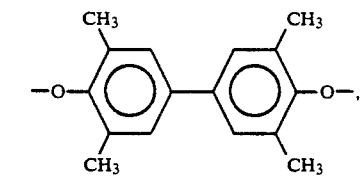

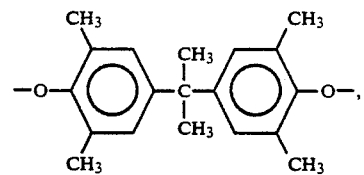

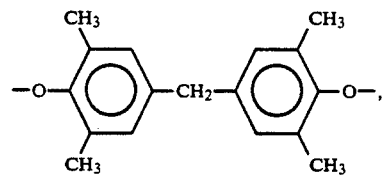

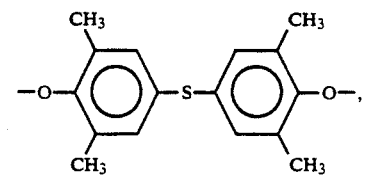

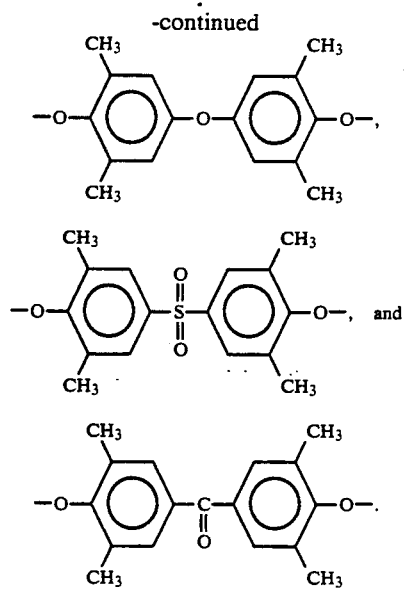

Representative examples of curable polyphenylene ether resins of formula (I) include a resin obtained by performing a substitution of poly(2,6-dimethyl-1,4-phenylene ether) with an allyl group and/or a propargyl group, a resin obtained by subjecting a bifunctional polyphenylene ether obtained by polymerization of 2,6-dimethylphenol in the presence of the above-mentioned bifunctional phenol compound Q—H)2 to a substitution with an allyl group and/or a propargyl group, and a resin obtained by subjecting a copolymer of 2,6-dimethylphenol and 2,3,6-trimethylphenol to a substitution with an allyl group and/or a propargyl group.

The method for producing the curable polyphenylene ether resin of formula (I) is not limited. Preferred methods for producing the curable polyphenylene ether resin of formula (I) are described in European Patent Application Laid Open Specification 0309025 (U.S. patent application Ser. No. 07/242,234).

The molecular weight of the curable polyphenylene ether resin of formula (I) is not critical, and the molecular weight can be varied in a wide range.

However, from the viewpoint of attaining the objective of the present invention, it is preferred that the curable polyphenylene ether resin of formula (I) have a viscosity number ($\eta$sp/c) of from 0.2 to 1.0 as measured in a 0.5 g/dl chloroform solution of the curable polyphenylene ether resin at 30° C. When the viscosity number is less than 0.2, the cured polyphenylene ether resin has poor mechanical properties. On the other hand, when the viscosity number exceeds 1.0, the softening temperature of the curable polyphenylene ether resin is disadvantageously high so that melt molding of the polymer is difficult.

In the present invention, the average substitution degree of allyl and propargyl groups is defined by the formula:

$$\frac{\text{total number of moles of allyl and propargyl groups in the polyphenylene ether resin}}{\text{number of moles of phenyl groups in the polyphenylene ether resin}} \times 100(\%)$$

The above-mentioned ratio of the total number of moles of allyl and propargyl groups to the number of moles of phenyl groups can be determined in terms of the ratio of the total area of peaks attributed to the protons of allyl and propargyl groups to the area of the peak attributed to the protons of phenyl groups on a $^1$H-NMR spectrum of the curable polyphenylene ether resin.

As is apparent from the above-mentioned definition of the average substitution degree, the possible maximum value of the average substitution degree is 400% by mole. From the viewpoint of attaining the objective of the present invention, however, it is necessary that the average substitution degree of the curable polyphenylene ether resin be in the range of from 0.1 to 100% by mole. Preferably, the average substitution degree is in the range of from 0.5 to 50% by mole. When the average substitution degree is less than 0.1% by mole, the cured polyphenylene ether resin would not have the desired chemical resistance. On the other hand, when the average substitution degree exceeds 100% by mole, the cured polyphenylene ether resin is disadvantageously brittle.

The curable polyphenylene ether resin compositions of the present invention comprises as another essential component at least one cyanurate selected from the group consisting of triallyl isocyanurate and triallyl cyanurate. Triallyl isocyanurate and triallyl cyanurate are trifunctional monomers respectively represented by the following formulae (IV) and (V):

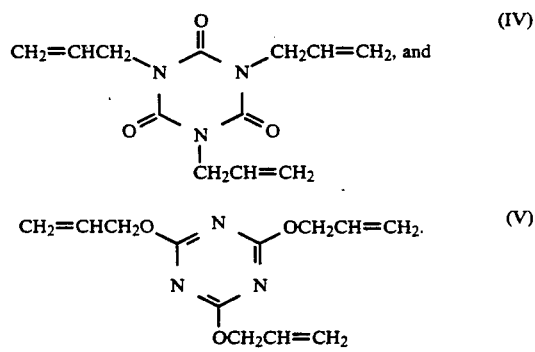

In the present invention, triallyl isocyanurate of formula (IV) and triallyl cyanurate of formula (V) may be used individually or in combination. When these are used in combination, the mixing ratio is not critical and can be varied in a wide range.

The curable polyphenylene ether resin composition of the present invention comprises (a) 98 to 40% by weight, based on the total weight of components (a) and (b), of a curable polyphenylene ether resin and (b) 2 to 60% by weight, based on the total weight of components (a) and (b), of at least one cyanurate selected from the group consisting of triallyl isocyanurate and triallyl cyanurate. When the proportion of component (b) is less than 2% by weight, satisfactory chemical resistance improvement cannot be attained for the cured polyphenylene ether resin composition. On the other hand, when the proportion of component (b) exceeds 60% by weight, there is obtained a cured polyphenylene ether resin composition having unfavorably increased dielectric constant and being extremely brittle. In addition, when the proportions of components (a) and (b) are outside the above-mentioned ranges, a film formed by a casting method, whether the film contains or does not contain a reinforcement, tends to be very brittle and have a sticky surface.

The method for obtaining a resin composition from components (a) and (b) is not critical, and the curable polyphenylene ether resin composition of the present invention can be obtained for example, by performing melt blending or blending in solution of components (a) and (b). When components (a) and (b) are blended in mixture, use is made of a solvent selected from the group consisting of halogen-substituted hydrocarbons, such as dichloromethane, chloroform and trichloroethylene, aromatic hydrocarbons, such as benzene, toluene and xylene, and mixtures thereof.

The curable polyphenylene ether resin composition of the present invention may be shaped and cured in a predetermined form prior to use in various application fields. The method for shaping is not limited. Generally, the shaping may be conducted by a conventional casting method in which the curable polyphenylene ether resin composition is dissolved in a solvent and shaped into a predetermined form, or by a conventional heat-melting method in which the curable polyphenylene ether resin composition is melted by heating and then shaped into a predetermined form.

Representative examples of solvents which may be used in the casting method include halogenated hydrocarbons such as chloroform, trichloroethylene and dichloromethane; and aromatic hydrocarbons such as benzene, toluene and xylene. These solvents may be used individually or in combination. The curable polyphenylene ether resin composition may generally be dissolved in the solvent at a concentration of 1 to 50% by weight. The form of the shaped article is not limited. Generally, the curable polyphenylene ether resin composition of the present invention may be shaped into a sheet or a film. For example, in the case of a film, the solution of the curable polyphenylene ether resin composition is coated or cast on a substrate, such as a stainless steel plate, a glass plate, a polyimide film, a polyester film or a polyethylene film. The thickness of the solution of the polyphenylene ether resin composition coated or cast on the substrate is not limited and is generally determined according to the intended thickness of the resultant film and the polyphenylene ether resin composition concentration of the solution. After coating or casting, the solvent of the solution is removed by air drying, hot-air drying, vacuum drying or the like, to thereby form a film. The film thus formed is peeled off from the substrate. If desired, the film thus obtained may again be subjected to removal of the solvent remaining in the film. However, it is not always required to completely remove the solvent from the film. The removal of the solvent is conducted at a temperature which does not exceed the temperature which the substrate can stand. Generally, the removal of the solvent can be conducted at about 23° C. to about 150° C.

In the case of the heat-melting method, the shaping of the polyphenylene ether resin composition which is melted by heating may be conducted by a customary melt molding method such as injection molding, transfer molding, extrusion, press molding or the like. The melt molding may generally be conducted at a temperature higher than the glass transition temperature of the curable polyphenylene ether resin but lower than the temperature at which the curable polyphenylene ether resin begins to cure.

As mentioned hereinbefore, the curable polyphenylene ether resin has an allyl group and/or a propargyl group as a substituent. The glass transition temperature of the curable polyphenylene ether resin is decreased in proportion to the increase of the average substitution degree. Generally, a polyphenylene ether resin having no allyl group and/or propargyl group (hereinafter often referred to as "unsubstituted polyphenylene ether") has a glass transition temperature of about 210° C. On the other hand, the curable polyphenylene ether resin to be used in the present invention has a glass transition temperature of from about 140° C. to about 210° C., which is lower than that of the unsubstituted polyphenylene ether by several to 70° C., due to the presence of the allyl groups and/or propargyl groups. Therefore, the curable polyphenylene ether resin composition of the present invention can easily be melt molded as compared to the compositions comprising the unsubstituted polyphenylene ether.

The above-mentioned casting method and heat-melting method can be used individually. Alternatively, these methods may also be used in combination. For example, it is possible that films of the polyphenylene ether resin composition are obtained by the casting method and, then, several to several tens of films are piled up and fused with one another by the melt molding method, such as press molding, to thereby obtain a sheet of the polyphenylene ether resin composition.

The curable polyphenylene ether resin composition of the present invention has excellent characteristics. Firstly, the resin composition of the present invention has excellent film forming properties. For example, while film formation according to a casting method using a solution is hardly expected with respect to the conventional polyphenylene ether, an excellent film having a smooth surface free of stickiness can be obtained according to a casting method from the curable polyphenylene ether resin composition of the present invention. Secondly, the curable polyphenylene ether resin composition of the present invention has excellent storage stability. The curable polyphenylene ether resin composition can be stored, without suffering from gel formation, in the form of a solution or a film for a prolonged period of time. Thirdly, since the curable polyphenylene ether resin to be used in the present invention has lower glass transition temperature and excellent melt flowability, it is easy to perform melt molding of the curable polyphenylene ether resin composition of the present invention.

In the curable polyphenylene ether (hereinafter often referred to simply as "PPE") resin composition of the present invention, a fire retardant may be incorporated as component (c) in order to improve the fire retardance of the composition without sacrificing the excellent properties, such as film-forming properties, storage stability and melt moldability, of the curable PPE resin composition comprising components (a) and (b). The fire retardant is selected from the group consisting of a phosphorous-containing fire retardant, a chlorine-containing fire retardant and a bromine-containing fire retardant. These may be used in combination.

Representative examples of phosphorus-containing fire retardants include phosphoric esters, such as triphenyl phosphate, triethyl phosphate and trichloroethyl phosphate, and fire retardants containing red phosphorus as a main component. Representative examples of chlorine-containing fire retardants include organic compounds containing chlorine, such as a chlorinated polyethylene and a chlorinated paraffin. Representative examples of bromine-containing fire retardants include organic compounds containing bromine, such as tetrabromobisphenol-A, tribromophenol, poly(2,6-dibromo-1,4-phenylene ether), a brominated polystyrene and a bromodiphenyl ether represented by the following formula:

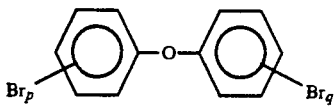

wherein each of p and q independently represents an integer of from 1 to 5 with the proviso that $4 \leq P+q \leq 10$.

Among the bromine-containing fire retardants described above, the bromodiphenyl ether is most preferred. Representative examples of bromodiphenyl ethers include tetrabromodiphenyl ether, hexabromodiphenyl ether, octabromodiphenyl ether and decabromodiphenyl ether. These bromodiphenyl ethers may be used individually or in combination. With respect to the fire retardant, reference may be made to "Polymer No Nannenka (Fire retardation of polymer)" by Hitoshi Nishizawa, published by Taiseisha, Japan, in 1987.

Further, a fire retardant having at least two ethylenically unsaturated double bonds may also be used. The use of such a fire retardant having crosslinking properties is advantageous from the viewpoint of the chemical resistance of a final cured PPE resin composition. Preferred examples of fire retardants having crosslinking properties include tetrabromobisphenol-A diallyl ether, tetrabromobisphenol-A diacrylate, tetrabromobisphenol-A dimethacrylate, tetrabromobisphenol-A di-2-acryloxyethyl ether, tetrabromobisphenol-A di(2-methacryloxyethyl) ether and the like.

In the curable PPE resin composition of the present invention, the amount of component (c) to be used is generally from 0 to 50% by weight, preferably from 1 to 50% by weight, more preferably from 5 to 50% by weight, most preferably from 2 to 30% by weight, based on the total weight of components (a) and (b). For sufficiently improving the fire retardance, it is preferred that the amount of component (c) be not smaller than 1% by weight. On the other hand, when the amount of the component (c) is more than 50% by weight, the dielectric properties, chemical resistance and mechanical properties of a final cured PPE resin composition are likely to be poor.

In the curable PPE resin composition of the present invention, an auxiliary fire retardant may further be incorporated as component (d) in order to further improve the fire retardance of the composition, especially the composition containing a reinforcement described below. Any customary auxiliary fire retardant can be used in the present invention. Preferred are antimony compounds, such as $Sb_2O_3$, $Sb_2O_5$ and $NaSbO_3 \cdot \frac{1}{2}H_2O$.

The suitable amount of the auxiliary fire retardant (d) to be incorporated is varied depending on the amount of the fire retardant (c). The amount of component (d) is generally from 0 to 50% by weight, preferably from 0.1 to 50% by weight, more preferably from 1 to 30% by weight, based on the total weight of components (a) and (b). For sufficiently improving the fire retardance, it is preferred that the amount of component (d) be not smaller than 0.1% by weight. On the other hand, when the amount of component (d) exceeds 50% by weight, the dielectric properties, chemical resistance and mechanical properties of a final cured PPE resin composition are likely to be poor.

There is no particular limitation with respect to the method for mixing the above-mentioned components. Generally, the components are mixed by dissolving them in a solvent or by melting them together.

In order to improve the mechanical strength, a reinforcement may be incorporated as component (e) in the curable PPE resin composition of the present invention comprising components (a) and (b), which has excellent film-forming properties, handling properties, storage stability and melt moldability or in the curable resin composition comprising component (c) or comprising components (c) and (d) in addition to components (a) and (b), which has not only excellent properties ascribed to components (a) and (b) but also excellent fire retardance.

Representative examples of reinforcements which may be used in the present invention include glass fabrics, such as glass roving cloth, glass cloth, glass chopped mat, glass surfacing mat and glass non-woven fabric; ceramic fiber fabrics, asbestos fabrics, metallic fiber fabrics and synthetic or natural inorganic fiber fabrics; woven or non-woven fabrics of synthetic fibers, such as polyvinyl alcohol fiber, polyester fiber, acrylic fiber and aromatic polyamide fiber; natural woven fabrics, such as cotton cloth, hemp cloth and felt; carbon fiber fabrics; and natural cellulosic fabrics, such as kraft paper, cotton paper and glass fiber-containing paper. These reinforcements may be used individually or in combination.

The reinforcement is preferably incorporated in the curable PPE resin composition comprising components (a) and (b) and, optionally, components (c) and/or (d), as follows. The curable PPE resin composition is first dissolved in a solvent selected from the group consisting of halogenated hydrocarbons, aromatic hydrocarbons and mixtures thereof and, then, the reinforcement is impregnated with the resultant solution. The impregnation is generally conducted by dipping the reinforcement in the solution or coating the solution on the reinforcement.

If desired, the impregnation may be repeated several times or conducted in such a manner that solutions having different formulations and concentrations are prepared and the reinforcement is treated with the solutions successively so that a predetermined reinforcement-containing PPE resin composition having a desired resin content is obtained.

In the curable PPE resin composition of the present invention, the amount of component (e) is generally from 0 to 90% by weight, preferably from 5 to 90% by weight, more preferably from 10 to 80% by weight, most preferably from 20 to 70% by weight, based on the total weight of components (a), (b), (c), (d) and (e). From the viewpoints of the dimensional stability and mechanical strength of a final cured PPE resin composition, it is preferred that the amount of component (e) be not smaller than 5 % by weight. On the other hand, when the amount of component (e) is more than 90% by weight, the dielectric properties of a final cured PPE resin composition are likely to be poor.

The curable PPE resin composition of the present invention is cured for example, by heating, as described hereinbelow. In the curing, crosslinking occurs. In order to lower the reaction temperature and promote the crosslinking reaction, a radical polymerization initiator may be incorporated in the curable PPE resin composition of the present invention.

The amount of the initiator which may be used in the present invention is preferably from 0.1 to 10 parts by weight, more preferably from 0.1 to 5 parts by weight, based on 100 parts by weight of the total amount of components (a) and (b).

As the radical polymerization initiator, either a peroxide initiator or a non-peroxide initiator can be used. Representative examples of radical polymerization peroxide initiators include peroxides, such as benzoyl peroxide, cumene hydroperoxide, 2,5-dimethylhexane-2,5-dihydroperoxide, 2,5-dimethyl-2,5-di(t-butylperoxy)-hexyne-3, di-t-butyl peroxide, t-butylcumyl peroxide, α,α'-bis(t-butylperoxy-m-isopropyl)benzene, 2,5-dimethyl-2,5-di(t-butylperoxy)hexane, dicumyl peroxide, di-t-butylperoxy isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide and trimethylsilyltriphenylsilyl peroxide and the like. Representative examples of non-peroxide initiators include 2,3-di-methyl-2,3-diphenylbutane and the like. However, the radical polymerization initiators which can be used for curing the curable polyphenylene ether resin of the present invention are not limited to those mentioned above.

In order to improve the adhesion to a metallic material and attain cost reduction, an epoxy resin can be incorporated in the curable PPE resin composition of the present invention.

Representative examples of epoxy resins include a glycidyl ether type epoxy resin, a glycidyl ester type epoxy resin, an amine type epoxy resin, and a brominated epoxy resin. With respect to epoxy resins, reference may be made to "Epoxy Resins" in Plastic Zairyo Koza (Lecture on Plastic Materials) published by Nikkan Kogyo Shinbunsha, Japan.

The amount of the epoxy resin which may be incorporated is generally from 10 to 90% by weight, preferably from 20 to 80% by weight, more preferably from 30 to 75% by weight, based on the sum of the total amount of the above-mentioned components (exclusive of a reinforcement) of the curable PPE resin composition and the amount of the epoxy resin. When the amount of the epoxy resin is less than 10% by weight, the adhesion improvement by the epoxy resin is not remarkable. On the other hand, when the amount of the epoxy resin exceeds 90% by weight, the dielectric properties of a final cured PPE resin composition is likely to be poor.

When a brominated epoxy resin is used as the epoxy resin so that the amount of bromine is 5% by weight or more, based on the total amount of the curable PPE resin of the curable PPE resin composition and the epoxy resin, the brominated epoxy resin contributes to the improvement of the fire retardance of the resin composition. When the amount of bromine is 10% by weight or more, the improvement of the fire retardance of the resin composition is remarkable. In the curable PPE resin composition of the present invention, if desired, a filler and/or an additive may be incorporated in order to impart additional desired properties to the composition, as long as such a filler and an additive do not adversely affect the properties of the composition. Representative examples of fillers include carbon black, silica, alumina, talc, mica, a glass bead, a hollow glass bead, and the like. Representative examples of additives include an antioxidant, a thermal stabilizer, an antistatic agent, a plasticizer, a pigment, a dye, a colorant and the like.

By curing the above-described curable polyphenylene ether resin composition comprising components (a) and (b) or the curable polyphenylene ether resin composition comprising at least one component selected from the group consisting of components (c), (d) and (e) in addition to components (a) and (b), there can be obtained a cured polyphenylene ether resin composition comprising components ($\alpha$) and ($\beta$) as described below or a cured polyphenylene ether resin composition comprising at least one component selected from the group consisting of components (c), (d) and (e) in addition to components ($\alpha$) and ($\beta$). That is, in another aspect of the present invention, there is provided a cured polyphenylene ether resin composition comprising:

($\alpha$) a chloroform nonextractable polyphenylene ether resin component;

($\beta$) a chloroform extractable polyphenylene ether resin component;

(c) 0 to 50% by weight, based on the total weight of components ($\alpha$) and ($\beta$), of a fire retardant selected from the group consisting of a phosphorus-containing fire retardant, a chlorine-containing fire retardant and a bromine-containing fire retardant;

(d) 0 to 50% by weight, based on the total weight of components ($\alpha$) and ($\beta$), of an antimony-containing auxiliary fire retardant; and (e) 0 to 90% by weight, based on the total weight of components ($\alpha$), ($\beta$), c , (d) and (e), of a reinforcement;

the cured polyphenylene ether resin composition being decomposable by pyrolysis gas chromatography to form (1) 2-methylphenol, (2) 2,6-dimethylphenol, (3) 2,4-dimethylphenol, (4) 2,4,6-trimethylphenol and (5) at least one cyanurate selected from the group consisting of triallyl isocyanurate and triallyl cyanurate in proportions such that the components (1), (2), (3), (4) and (5) satisfy the following formula:

$$0.05 \leq \frac{E}{A + B + C + D} \times 100 \leq 40,$$

wherein A, B, C, D and E represent the areas of peaks on a pyrolysis gas chromatogram attributed to the components (1), (2), (3), (4) and (5), respectively, the chloroform extractable polyphenylene ether resin component ($\beta$) being present in an amount of from 0.01 to 10% by weight, based on the total weight of components ($\alpha$), ($\beta$), (c) and (d), as determined from the amount of a chloroform extract obtained by treating the cured resin composition with chloroform at 23° C. for 12 hours, the chloroform extractable polyphenylene ether resin component ($\beta$) containing at least one cyanurate selected from the group consisting of triallyl isocyanurate and triallyl cyanurate and containing units of the formula:

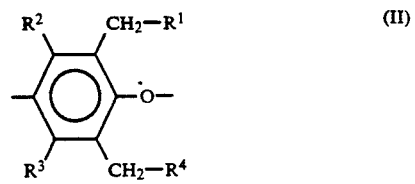

(II)

wherein $R^1$, $R^2$, $R^3$ and $R^4$ each independently represent a hydrogen atom, an allyl group or a propargyl group, at least one of $R^1$, $R^2$, $R^3$ and $R^4$ being other than hydrogen, with the proviso that said units of formula (II) in said chloroform extractable polyphenylene ether resin component ($\beta$) are the same or different.

The curing of the curable PPE resin composition of the present invention to produce the above-mentioned cured PPE resin composition can be performed according to conventional means, such as heating, exposing to light, exposing to electron beam, etc. When heating is performed, the temperature is not specifically limited. However, generally, the heating is performed at from 100° to 350° C., preferably from 150° to 300° C., depending on the decomposition temperature of an initiator used. The period during which the heating is performed is generally in the range of from one minute to about five hours, preferably from one minute to about three hours. The curing reaction of the curable PPE resin composition of the present invention can be monitored by differential scanning calorimetry, infrared spectroscopy (hereinafter referred to as IR) or the like.

Whether a cured PPE resin composition is one obtained by curing a curable composition containing a polyphenylene ether resin and triallyl isocyanurate and/or triallyl cyanurate, can be confirmed by IR, high resolution nuclear magnetic resonance (hereinafter referred to as "NMR") spectroscopy [generally referred to as "Cross Polarization Magic Angle Spinning (CPMAS) spectroscopy"], pyrolysis gas chromatography, or other known techniques. Of these, pyrolysis gas chromatography is particularly useful. When pyrolysis gas chromatography is used, the present cured resin composition can readily be distinguished from the conventional cured polyphenylene ether resin compositions. That is, when the cured polyphenylene ether resin composition of the present invention is decomposed by pyrolysis at 590° C. for 4 seconds in an inert gas atmosphere, a characteristic decomposition product containing the following components, i.e., (1) 2-methylphenol, (2) 2,6-dimethylphenol, (3) 2,4-dimethylphenol, (4) 2,4,6-trimethylphenol and (5) at least one cyanurate selected from the group consisting of triallyl isocyanurate and triallyl cyanurate is formed in proportions such that the components (1), (2), (3), (4) and (5) satisfy the following formula:

$$0.05 \leq \frac{E}{A+B+C+D} \times 100 \leq 40,$$

wherein A, B, C, D and E represent the areas of peaks on a pyrolysis gas chromatogram attributed to the components (1), (2), (3), (4) and (5), respectively, Of these decomposition product components, components (1), (2), (3) and (4) are decomposition products attributed to the polyphenylene ether. The mechanism of formation of such decomposition product components is described in, for example, Journal of Applied Polymer Science, vol. 22, page 2891 (1978).

When the content of triallyl isocyanurate and/or triallyl cyanurate in the cured polyphenylene ether resin composition increases, the amount of component (5) relative to that of components (1), (2), (3) and (4) increases. When the value of $E/(A+B+C+D)$ defined above is less than 0.05, the amount of component (5), namely, triallyl isocyanurate and/or triallyl cyanurate in the cured PPE resin composition is insufficient. Such a cured PPE resin composition is disadvantageously poor in chemical resistance. On the other hand, when the value of $E/(A+B+C+D)$ exceeds 40, the cured PPE resin composition is disadvantageously brittle and has poor dielectric properties.

The method of heating to be employed in pyrolysis gas chromatography is not critical. For example, such heating may be performed by any one of the filament heating method, furnace heating method, high frequency induction heating method and laser heating method. Of these methods, the high frequency induction heating method (for example, by means of Curie point pyrolyzer) is most preferred because not only is a rapid heating feasible but also the resultant temperature is accurate and reproducible.

Further conditions for performing pyrolysis are not particularly limited. For example, pyrolysis is satisfactorily performed by heating in an inert gas atmosphere at 590° C. for 4 seconds. It is preferred that helium or nitrogen gas be used as the inert gas, since such a gas can also be utilized as a carrier gas in gas chromatography. Samples for pyrolysis are preferably in powdery form, since it ensures high reproducibility.

Separation columns to be employed in the gas chromatography are not limited, as long as each of the above-mentioned decomposition product components (1) to (5) can be completely separated. Generally, however, a nonpolar column of methylsilicone or a column having about the same nonpolarity as that of methylsilicone is most preferred. With respect to the type of column, both a packed column and a capillary column can be used. Of these, the latter is preferred because it ensures excellent separation. Column temperature is not limited. From the viewpoint of the saving of separation time, it is generally preferred that the column temperature be elevated from room temperature at a rate of 10° to 20° C. per min.

In gas chromatography (GC), a thermal conductivity type detector (TCD) and a flame ionization type detector (FID) may be used as a detector. The GC may be connected to a mass spectrometer (MS) to permit joint use of these instruments. When only qualitative analysis is sufficient, a Fourier-transform infrared spectrometer (FT-IR) may be used in place of the above-mentioned detectors.

In addition to pyrolysis gas chromatography, as an effective method for conducting the structural analysis of the cured polyphenylene ether resin composition of the present invention, there may be mentioned an analysis of chloroform extracts. The cured polyphenylene ether resin composition of the present invention comprises a chloroform nonextractable polyphenylene ether resin component ($\alpha$) and a chloroform extractable polyphenylene ether resin component ($\beta$). The content of the chloroform extractable polyphenylene ether resin component ($\beta$) can be determined by chloroform extraction as follows.

The content (W %) of the chloroform exactable polyphenylene ether resin component ($\beta$) in the cured PPE resin composition is determined by weighing a resin sample (weight: $W_1$), immersing the sample in chloroform at 23° C. for 12 hours, taking out the sample from chloroform, removing the chloroform, weighing the resultant sample (weight: $W_2$), and calculating in accordance with the formula:

$$W = \frac{W_1 - W_2}{W_1} \times 100 \, (\%).$$

In the above formula, $W_1-W_2$ means the amount of a chloroform extract. From the viewpoint of the facility in removing chloroform after immersion, it is preferred that the resin sample be in a film form or powdery form. In the cured polyphenylene ether resin composition of the present invention, the chloroform extractable polyphenylene ether resin component ($\beta$) is present in an amount of from 0.01 to 10% by weight, preferably from 0.01 to 5% by weight, based on the total weight of components ($\alpha$), ($\beta$), (c) and (d). When the amount is less than 0.01% by weight, the cured PPE resin composition is disadvantageously brittle. On the other hand, when the amount exceeds 10% by weight, the chemical resistance of the cured PPE resin composition is poor.

The content of the chloroform extractable polyphenylene ether resin component ($\beta$) may also be determined using deuterated chloroform. In this case, by obtaining an NMR spectrum of the deuterated chloroform solution of the extract, the composition and the structure of the chloroform extractable polyphenylene ether resin component ($\beta$) can be determined.

The chloroform extractable polyphenylene ether resin component ($\beta$) of the cured polyphenylene ether resin composition of the present invention contains at least one cyanurate selected from the group consisting of trially isocyanurate and trially cyanurate and contains units of the formula:

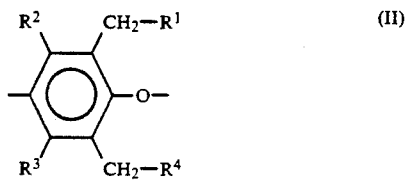

wherein $R^1$, $R^2$, $R^3$ and $R^4$ each independently represent a hydrogen atom, an ally group or a propargyl group, at least one of $R^1$, $R^2$, $R^3$ and $R^4$ being other than hydrogen, with the proviso that said units of formula (II) in said chloroform extractable polyphenylene ether resin component ($\beta$) are the same or different.

The chloroform extractable polyphenylene ether resin component ($\beta$) is a portion of the cured polyphenylene ether resin composition which has not contributed to the curing reaction during the curing step. However, the chloroform extractable polyphenylene ether resin component ($\beta$) has not necessarily the same structure as that of the curable polyphenylene ether resin. The ratio of triallyl isocyanurate and/or triallyl cyanurate to units of formula (II) is not limited.

The average substitution degree of allyl and propargyl groups with respect to the polyphenylene ether of formula (II) of the chloroform extractable polyphenylene ether resin component ($\beta$) is generally in the range of from 0.1 to 100% by mole, as in the curable polyphenylene ether resin composition. The average substitution degree with respect to the polyphenylene ether of formula (II) of the chloroform extractable polyphenylene ether resin component ($\beta$) is not necessarily identical with that of the curable polyphenylene ether resin composition.

Further, the hydrogen or bifunctional phenol residue which is ascribed to Q' of component (a) may or may not be present in the chloroform extract.

The structure of the chloroform extractable polyphenylene ether resin component ($\beta$) of the cured polyphenylene ether resin composition can be confirmed by nuclear magnetic resonance spectroscopy (NMR) as mentioned above, infrared spectroscopy (IR, etc. Of these, NMR, especially $^1$H-NMR, is preferred.

The cured PPE resin composition of the present invention has excellent chemical resistance. When a conventional cured polyphenylene ether not containing triallyl isocyanurate and/or triallyl cyanurate is immersed in boiling trichloroethylene, it swells to a great extent and suffers from a substantial change in appearance. By contrast, with respect to the cured PPE resin composition of the present invention, even when it is immersed in boiling trichloroethylene, swelling is slight and no change in appearance is observed. Further, the cured polyphenylene ether resin composition of the present invention maintains the excellent desired dielectric properties (i.e., low dielectric constant and low dielectric dissipation factor) of the starting polyphenylene ether. Therefore, the present cured PPE resin composition can advantageously be employed as a material for various applications in the field of electronics, such as a material for a printed board.

Further, since the curing between the allyl groups and/or propargyl groups of the curable polyphenylene ether and the allyl groups of triallyl isocyanate and/or triallyl cyanurate is performed by addition reaction, byproducts, such as water and a gas as formed in curing an epoxy resin and a polyimide due to condensation reaction, are not formed in curing the curable polyphenylene ether resin composition of the present invention. This is advantageous in that the cured PPE resin composition can provide films, sheets and other articles having no voids.

In the cured PPE resin composition, a fire retardant and/or an auxiliary fire retardant may be present in any form. That is, the fire retardant may be present in one or both of the chloroform nonextractable PPE resin component ($\alpha$) and the chloroform extractable PPE resin component ($\beta$). Further, the fire retardant may be bonded to the polyphenylene ether chain by covalent bonding as in the case in which a crosslinkable fire retardant is used.

The fire retardant contained in the cured PPE resin composition of the present invention is preferably at least one selected from the group consisting of a phosphorus-containing fire retardant, a chlorine-containing fire retardant and a bromine-containing fire retardant, as mentioned hereinbefore with respect to the curable PPE resin composition of the present invention. The qualitative and quantitative analyses of the fire retardant contained in the cured PPE resin composition can be performed by fluorescence X-ray spectroscopy and emission spectral analysis or the like. Alternatively, the fire retardant may be analyzed by another method, such as titration, ion chromatography and the like, which is performed after decomposing the cured PPE resin composition by heating or by the action of an acid, etc.

The cured PPE resin composition of the present invention which contains a fire retardant or contains a fire retardant and an auxiliary fire retardant, exhibits improved fire retardance which is classified into V-1 or V-0 (in Vertical Burning Test for Classifying Materials, described below), while maintaining the excellent properties of the cured PPE resin composition comprising components (α) and (β) mentioned hereinbefore.

A reinforcement-containing cured PPE resin composition of the present invention may be prepared, for example, by the following method. A plurality of sheets of a reinforcement-containing curable PPE resin composition are piled up and subjected to press molding to shape the same while effecting thermal curing, so as to obtain a reinforcement-containing cured PPE resin composition having a desired thickness. When the reinforcement-containing curable PPE resin composition sheets are piled up, one or more films which have been shaped from the curable PPE resin composition containing no reinforcement may optionally be combined with the above-mentioned sheets. Moreover, reinforcement-containing cured PPE resin compositions having various layer structures may be obtained by subjecting to press molding a composite comprising a reinforcement-containing cured PPE resin composition and, combined therewith, a reinforcement-containing curable PPE resin composition and/or a curable PPE resin composition containing no reinforcement.

The shaping and thermal curing are usually conducted at one time by means of a heat-pressing machine, as mentioned above. However, the shaping and thermal curing may be conducted separately. That is, a shaped composite which has been prepared for example, by piling up and pressing together curable PPE resin compositions, can be subjected to heat treatment and the like, to thereby effect curing. The shaping and thermal curing are generally conducted at a temperature of 100° to 350° C. under a pressure of 0.1 to 1000 kg/cm$^2$ for 1 minute to 5 hours, preferably at a temperature of 150° to 300° C. under a pressure of 1 to 500 kg/cm$^2$ for 1 minute to 3 hours.

With respect to the cured PPE resin composition of the present invention containing an epoxy resin, there can optionally be employed various curing agents, such as a primary amine, a secondary amine, a dicarboxylic acid and an anhydride thereof, in order to facilitate the curing reaction of the epoxy resin.

The reinforcement-containing cured PPE resin composition of the present invention has excellent mechanical properties while maintaining the excellent chemical resistance, dielectric properties, etc. of the cured PPE resin composition comprising components (α) and (β) and maintaining the excellent fire retardance (as well as the above-mentioned excellent properties) of the cured PPE resin composition comprising components (c) and (d) in addition to components (α) and (β). The reinforcement-containing PPE resin composition not only does not exhibit any change in appearance when heated in a solder bath at 260° C. for 120 seconds, but also is excellent in mechanical strength and dimensional stability (along the X-Y direction and Z-direction). These excellent properties ensure that the reinforcement-containing cured PPE resin composition of the present invention can advantageously be used in the field of electronics as a material for a printed circuit board, particularly, a multilayer printed circuit board.

In a further aspect of the present invention, there is provided a laminate structure comprising a primary metallic foil layer and at least one cured resin composition layer disposed on at least one surface of the metallic foil. The cured resin composition is a cured polyphenylene ether resin composition as described above. When the laminate structure has at least two cured resin composition layers on at least one surface of the metallic substrate, the cured resin composition layers may be the same or different and are disposed one upon another.

Representataive examples of metallic foils which constitute the primary metallic foil include a copper foil, an aluminum foil and the like. The thickness of the metallic foil is not specifically limited. Generally, the thickness of the metallic foil may be from 5 to 200 μm, preferably from 5 to 100 μm.

As described above, the laminate structure of the present invention may have one cured resin composition layer. Alternatively, the laminate structure may have at least two cured resin composition layers. When the laminate structure of the present invention has at least two cured resin composition layers, the layers may be either the same or different, and the layers are disposed one upon another.

Further, the cured resin composition layer may be disposed on one surface of the primary metallic foil layer, or may also be disposed on both surfaces of the primary metallic foil layer.

The laminate structure of the present invention may further comprise an additional metallic foil layer. Representative examples of metallic foils which constitute the additional metallic foil layer are the same as those described above with respect to the primary metallic foil. The additional metallic foil layer is disposed on the outer surface of the cured resin composition layer when the laminate structure has one cured resin composition layer on at least one surface of the primary metallic foil. On the other hand, when the laminate structure has at least two cured resin composition layers on at least one surface of the primary metallic foil, the additional metallic foil layer is disposed on the outer surface of an outermost cured resin composition layer and/or between at least one of the cured resin composition layers and a cured resin composition layer adjacent thereto.

The method for producing the laminate structure of the present invention is not specifically limited. For example, the laminate structure may be produced by piling up a predetermined number of films of the curable PPE resin composition of the present invention and metallic foils to form a laminate, and heating the laminate under pressure so as to cure the PPE resin composition films and simultaneously bond the metallic foils to the films. The curable PPE resin composition films may either contain a reinforcement or not. A curable PPE resin composition film containing a reinforcement may be used in combination with the curable PPE resin composition containing no reinforcement. Also, the curable PPE resin composition films may contain a fire retardant or contain a fire retardant and an auxiliary fire retardant.

As mentioned above, an additional metallic foil layer may be provided on one surface of the laminate structure. When the laminate structure comprises at least two cured resin composition layers, additional metallic foil layers may be provided on both surfaces of the laminate structure, and/or an additional metallic foil layer may also be provided as an intermediate layer of the laminate structure.

Further, it is also possible that at least two of the cured laminate structures are disposed one upon another through the curable PPE resin composition layer, followed by curing under pressure.

Moreover, it is possible that the cured laminate structure and a metallic foil are disposed one upon another through the curable PPE resin composition or an adhesive, followed by curing under pressure. Examples of adhesives include an epoxy resin adhesive, an acrylic resin adhesive, a phenolic resin adhesive, a cyanoacrylate adhesive and the like. However, the adhesive usable for bonding the metallic foil to the cured laminate structure is not limited to the above-mentioned examples.

The laminate formation and curing of a curable laminate is generally conducted simultaneously by means of a pressing machine. Alternatively, the laminate formation and the curing may be conducted separately. That is, the curable PPE resin compositions and metallic foils are piled up and pressed at relatively low temperature to form an uncured or half-cured laminate and, then, the uncured or half-cured laminate is subjected to heat treatment at relatively high temperature, high energy ray-radiation, etc., to thereby cure the laminate. The heat treatment for curing the uncured or half-cured laminate may generally be conducted at 100° to 350° C. under a pressure of 0.1 to 1000 kg/cm$^2$ for 1 minute to 5 hours, preferably at 150° to 300° C. under a pressure of 1 to 500 kg/cm$^2$ for 1 minute to 3 hours.

The laminate structure of the present invention has the above-mentioned excellent properties ascribed to the cured PPE resin composition of the present invention. In addition, the laminate structure has excellent bonding strength between the metallic foil layer and the cured resin composition layer. Especially when the curable PPE resin composition containing an epoxy resin is used, the bonding strength between the metallic foil layer and the cured resin composition layer is comparable to that of the laminate structure prepared using an epoxy resin only. Therefore, the laminate structure of the present invention can advantageously be used as a material for, for example, a rigid, single-sided copper-clad laminate, a rigid, double-sided copper-clad laminate, a multilayer circuit board, a flexible printed circuit board, a semi-rigid circuit printed board, a double sided, flexible, copper-clad printed circuit board and the like.

In still a further aspect of the present invention, there is provided a composite structure comprising a metallic substrate and at least one cured resin composition layer disposed on at least one surface of the metallic substrate, the cured resin composition of which is a cured polyphenylene ether resin composition as described above, with the proviso that when the composite structure has at least two cured resin composition layers on at least one surface of the metallic substrate, the cured resin composition layers are the same or different and are disposed one upon another.

Examples of metallic substrates include an iron plate, an aluminum plate, a silicon steel sheet, a stainless steel sheet, and the like. The thickness of the metallic substrate is not specifically limited. Generally, the thickness of the substrate may be from 0.2 to 10 mm, preferably from 0.2 to 5 mm.

The composite structure of the present invention may comprise one cured resin composition layer. Alternatively, the composite material may comprise at lest two cured resin composition layers. When the composite structure of the present invention may comprise at least two cured resin composition layers, the resin composition layers may be either the same or different and the cured resin composition layers are disposed one upon another.

The cured resin composition layer or layers may be formed on one surface of the metallic substrate. Alternatively, the cured resin composition layer or layers may be formed on both surfaces of the metallic substrate.

The method for producing the composite structure of the present invention is not specifically limited. Generally, the composite structure may be produced by disposing a predetermined number of curable PPE resin composition films on one or both surfaces of a metallic substrate, and heating them under pressure to cure the PPE resin composition films and simultaneously bond the PPE resin composition films to the metallic substrate.

The heat treatment for curing and bonding the curable PPE resin composition may generally be conducted at 100° to 350° C. under a pressure of 0.1 to 1000 kg/cm$^2$ for 1 minute to 5 hours, preferably at 150° to 300° C. under a pressure of 1 to 500 kg/cm$^2$ for 1 minute to 3 hours.

For improving the bonding strength between the metallic substrate and the cured resin composition layer, it is preferred that the substrate be preliminarily subjected to surface treatment. For example, the substrate may be subjected to mechanical abrasion, such as sanding by means of an abrasive paper or an abrasive cloth, wet blasting or dry blasting, and subsequently subjected to degreasing, etching, anodization, chemical film formation and the like. When an aluminum plate is used as a substrate, it is preferred that the aluminum plate be successively subjected to abrasion, degreasing using sodium carbonate and etching with sodium hydroxide. However, the surface treatment of an aluminum plate is not limited to the methods described above.

The composite structure of the present invention may have a metallic foil layer. The metallic foil layer is disposed on the outer surface of the cured resin composition layer when the composite structure has one cured resin composition layer on at least one surface of said metallic substrate. When the composite structure has at least two cured resin composition layers on at least one surface of said metallic substrate, a metallic foil layer is disposed on the outer surface of an outermost cured resin composition layer and/or between at least one of the cured resin composition layers and a cured resin composition layer adjacent thereto.

The composite structure of the present invention has the excellent properties ascribed to the cured PPE resin composition of the present invention. Further, the present composite structure has excellent bonding strength between the metallic substrate and the cured resin composition layer, as in the case of the laminate structure of the present invention. Especially when the curable PPE resin composition containing an epoxy resin is used, the bonding strength between the metallic substrate and the cured resin composition layer is comparable to that of the laminate structure prepared using only an epoxy resin. The most marked advantage of the composite structure of the present invention is its excellent ability to dissipate heat. Further, the composite structure of the present invention has excellent dimensional stability in the direction of the X-Y axes. Therefore, the composite structure of the present invention can advantageously be used as, for example, a chassis for mounting electronic parts.

As apparent from the foregoing, the curable PPE resin composition of the present invention has the following advantages. Firstly, the curable PPE resin composition has excellent film-forming properties when it is subjected to film casting, differing from the conventional PPE which cannot be shaped into a film by film casting using a solvent. The film prepared from the curable PPE resin composition of the present invention has a smooth and nonsticky surface and, therefore, has excellent handling properties. Secondly, the curable PPE resin composition of the present invention is excellent in storage stability. Therefore, the curable PPE resin composition can be stored for a prolonged period of time in the form of a liquid or a film without the occurrence of gel formation. Thirdly, curable PPE resin composition has low glass transition temperature and is excellent in flowability when it is melted and, therefore, the melt molding of the resin composition can easily be conducted. In order to improve the fire retardance, a fire retardant, or a fire retardant and an auxiliary fire retardant may be incorporated in the curable PPE resin composition. Further, in order to improve the dimensional stability of the curable PPE resin composition, a reinforcement may be incorporated in the resin composition, which may or may not contain a fire retardant.

The cured PPE resin composition of the present invention has the following advantages. Firstly, the cured PPE resin composition is excellent in chemical resistance. This property is attributed to both of the triallyl isocyanurate and/or tryallyl cyanurate and allyl and/or propargyl group introduced in the PPE. When either of the groups is missing, the properties of the cured PPE resin composition are adversely affected to such an extent that the resin composition is markedly swollen and the appearance thereof changes when it is immersed in boiling trichloroethylene. Secondly, the dielectric properties (dielectric constant and dielectric dissipation factor) of the cured PPE resin composition, which are ascribed to the PPE resin, are not adversely affected by the incorporation of components (b) to (d) in the curable PPE resin. Thirdly, the heat resistance of the cured PPE resin composition is maintained in spite of the presence of components (b) to (d). Illustratively stated, even when the cured resin composition is heated in a solder bath at 260° C. for 120 seconds (as described below), the appearance of the cured resin composition does not change. The curing for obtaining the cured PPE resin composition of the present invention is achieved by addition reaction between an allyl and/or propargyl group present in the curable PPE resin and an allyl group present in triallyl isocyanurate and/or triallyl cyanurate, and hence, by-products, such as water and a gas, are not formed during the reaction. Therefore, a film, a sheet or other shaped articles of the cured PPE resin composition having no voids can be obtained. When the cured PPE resin composition of the present invention contains a reinforcement, it has mechanical properties and dimensional stability (in the directions of the X-Y axes and Z axis). Further, when the cured PPE resin composition contains a fire retardant or contains a fire retardant and an auxiliary fire retardant, it is also excellent in fire retardance. Especially, a reinforcement-containing cured PPE resin composition shows excellent fire retardance in the presence of both a fire retardant and an auxiliary fire retardant.

When the curable or cured PPE resin composition of the present invention contains an epoxy resin, the following additional advantages are brought about. When the epoxy resin content is low relative to the curable or cured PPE resin content, the bonding strength between the metallic foil layer and the curable or cured resin composition layer is markedly improved as compared to that when no epoxy resin is contained in the curable or cured PPE resin composition. On the other hand, when the epoxy resin content is high relative to the curable or cured PPE resin content, the low dielectric properties of the PPE resin composition are markedly improved than those of the epoxy resin per se.

The laminate structure of the present invention comprising the cured PPE resin composition described above has excellent bonding strength between the metallic foil layer and the cured resin composition layer as compared to that of the conventional laminate structure. Especially when the cured resin composition layer contains an epoxy resin, the bonding strength is markedly improved as described above.

The composite structure of the present invention has, in addition to the above-mentioned excellent properties, excellent heat dissipation properties.

Since the curable PPE resin composition, cured PPE resin composition, laminate structure and composite structure of the present invention have the excellent properties described above, they can advantageously be used as a material for a low-dielectric constant printed circuit board, a flexible printed circuit board, a molded wiring board, a single-sided copper-clad laminate, a double-sided copper-clad laminate, a prepreg for a multilayer board, a printed circuit board having a metallic substrate, and the like. Further, the curable PPE resin composition of the present invention can also be used as a packaging material for a semiconductor, a material for a substrate of an antenna for satellite broadcasting and an electrically insulating film for VLSI (very large scale integrated circuit), a material for a microwave oven, a material for a resist such as a solder resist and a dry film resist, a photosensitive material, a material for an adhesive, a matrix resin for a composite material, and the like.

DETAILED DESCRIPTION OF THE PREFERRED EMBODIMENTS

Hereinafter, the present invention will be described in more detail with reference to examples and comparative examples, which should not be construed as limiting the scope of the present invention.

EXAMPLES 1 TO 4

Syntheses of curable PPE resins

As representative examples of curable PPE resins represented by formula (I), four allyl group-substituted PPE resins shown in Table 1 were prepared. The methods for preparing the allyl group-substituted PPE resins were substantially the same as described below except that the amounts of n-butyl lithium and allyl bromide were changed. Hereinbelow, the methods for preparing the allyl group-substituted PPE resins are explained in reference to the method for preparing an allyl group-substituted PPE resin used in Example 2 as a representative example.

350 g of poly(2,6-dimethyl-1,4-phenylene ether) having a viscosity number ($\eta sp/c$) of 0.57 as measured in a 0.5 g/dl chloroform solution at 30° C. (hereinafter referred to as PPE-1) was dissolved in 7.0 liter of tetrahydrofuran (hereinafter referred to as "THF"). To the mixture was added 390 ml of a 1.5 mol/liter n-butyl lithium solution in hexane, and the resultant mixture was allowed to react in a nitrogen atmosphere at 40° C. for 1 hour. To the reaction mixture was added 30 ml of allyl bromide, followed by agitation at 40° C. for 30 minutes. The resultant mixture was poured in a mixture of 2.8 liter of distilled water and 2.8 liter of methanol, thereby precipitating a polymer. The polymer was filtered off, and washed with methanol. The filtration and washing with methanol were repeated five times. Then, the polymer was dried in vacuo at 80° C. for 14 hours. Thus, a white, powdery, allyl group-substituted PPE-1 was obtained. The thus obtained PPE-1 had an average allyl group substitution degree of 10% as measured by means of $^1$H-NMR analyzer, and a viscosity number ($\eta$sp/c) of 0.61 as measured in a 0.5 g/dl chloroform solution at 30° C.

As described above, in Examples 1, 3 and 4, substantially the same manner as described in Example 2 was repeated except that amounts of n-butyl lithium and allyl bromide were changed, thereby obtaining PPE resins having different average allyl group substitution degrees.

Curable PPE resin compositions

Curable PPE resin compositions were prepared according to the formulation shown in Table 1. The preparation method will be described below with reference to Example 2.

5.4 g of the allyl group-substituted PPE-1 having an average allyl group substitution degree of 10%, 0.6 g of triallyl isocyanurate (hereinafter referred to as "TAIC"), and 0.18 g of 2,5-dimethyl-2,5-di(t-butyl peroxy)hexyne-3 (Perhexyne 25B, manufactured and sold by Nippon Oil & Fats Co., Ltd., Japan) as an initiator were dissolved in 120 ml of trichloroethylene. The mixture was shaped in the form of a film at 23° C. by a film casting method. The thus obtained film had a thickness of about 100 μm, and had a smooth and nonsticky surface. From the film, a strip having a width of 3 mm and a length of 20 mm was cut off, and the glass transition temperature of the strip was measured by means of a thermomechanical analyzer (hereinafter referred to as "TMA"). The result shows that the strip had a glass transition temperature of 145° C.

In Examples 1, 3 and 4, curable PPE resin composition films were prepared by a film casting method in substantially the same manner as described above except that each of the curable PPE resins obtained above was used. All of the thus obtained curable PPE resin compositions were excellent in film-forming properties and had a smooth and nonsticky surface. The glass transition temperatures of the curable PPE resin compositions as measured by means of TMA are shown in Table 1.

The above-mentioned films were also excellent in storage stability and, therefore, when the films were allowed to stand at room temperature for three months, gel formation did not occur in the films.

Cured PPE resin compositions 12 sheets of each of the above-mentioned curable PPE resin composition films were piled up, and subjected to heating under pressure while elevating the temperature from room temperature to 280° C. and maintaining them at 280° C. for 30 minutes by the use of a vacuum pressing machine, followed by cooling, to thereby obtain a cured PPE resin composition film having a thickness of about 1 mm. In any of Examples 1 to 4, the molding of the curable PPE resin composition was readily performed because the curable PPE resin compositions had low glass transition temperature and excellent fluidity when it was melted. Properties of each of the obtained cured PPE resin composition films are collectively shown in Table 2. Each of the properties was measured by the method described below.

1. Amount of chloroform extractable PPE resin component:

A portion of each film was rasped off by means of a file, thereby obtaining a fine powder of cured resin composition. The obtained fine powder was weighed and immersed in chloroform at 23° C. for 12 hours. Then, the powder was taken out, dried and weighed. The amount of chloroform extractable PPE resin component of each cured film was calculated by the following formula:

$$\text{The amount of chloroform extractable PPE resin component} = \frac{\text{weight before immersion in chloroform} - \text{weight after immersion in chloroform}}{\text{weight before immersion in chloroform}} \times 100(\%).$$

2. Ratio of phenols to TAIC formed by thermal decomposition:

A portion of each film was reduced to fine powder and subjected to pyrolysis gas chromatography analysis, thereby determining the ratio of phenols to TAIC. Pyrolysis gas chromatography was performed under the following conditions.

(Pyrolysis)
  Apparatus: Curie point prolyzer JHP-3S (manufactured by Japan Analytical Industry Co., Ltd., Japan)
  Temperature of the oven:300° C.
  Pyrolysis conditions:590° C., 4 seconds (Gas chromatography)
  Apparatus: Gas chromatograph 5890A (manufactured by Hewlett Packard, U.S.A.)
  Column:DB-1 (manufactured by J & W, U.S.A.), 0.25 mm in inside diameter×30 m in length
  Column temperature: increased from 50° C., at a rate of 10° C./min
  Carrier gas:He
  Detector:FID Peaks on a pyrolysis gas chromatogram were identified by comparison of their retention times, mass spectra and FT-IR spectra with those of commercially available standard reagents.

By the decomposition by pyrolysis gas chromatography, (1) 2-methylphenol, (2) 2,6-dimethylphenol, (3) 2,4-dimethylphenol, (4) 2,4,6-trimethylphenol and (5) TAIC were formed. The ratio of phenols (1), (2), (3) and (4) to TAIC (5) was calculated by the following formula:

$$\text{Ratio of phenols to } TAIC = \frac{E}{A + B + C + D} \times 100$$

wherein A, B, C, D and E represent the areas of peaks on a pyrolysis gas chromatogram attributed to said components (1), (2), (3), (4) and (5), respectively.

3. Glass transition temperature:

Glass transition temperature was measured by means of a differential scanning calorimeter (hereinafter referred to as "DSC").

4. Resistance to trichloroethylene:

From each cured PPE resin film, a portion of a square shape (about 15 mm×15 mm) was cut off and boiled in trichloroethylene for 5 minutes. The resistance to trichloroethylene of the film was evaluated by the weight increase after boiling in trichloroethylene for 5 minutes and by the change in appearance of the sheet film.

$$\text{Weight increase} = \frac{\text{weight after boiling} - \text{weight before boiling}}{\text{weight before boiling}} \times 100(\%)$$

5. Dielectric constant and Dielectric dissipation factor:

Dielectric constant and dielectric dissipation factor were measured at 1 MHz in accordance with ASTM D150.

In all of the Examples 1 to 4, the cured PPE resin compositions had good resistance to trichloroethylene and were excellent in dielectric constant and dielectric dissipation factor.

Further, the structure of each of the cured PPE resin compositions was analyzed as follows. First, each cured PPE resin composition was pulverized and subjected to FT-IR analysis (diffuse reflectance method). As a result, the presence of a skeleton of PPE was confirmed in all of the cured PPE resin compositions. Characteristic peaks of the spectrum were as follows.

$\nu s, \nu as, CH_3, CH_2$ (3027–2862 cm$^{-1}$)

$\nu s\ C\ \ C$ (1603 cm$^{-1}$)

$\left.\begin{array}{l}\delta as\ CH_3 \\ \nu s\ C\ \ C\end{array}\right\}$ (1470 cm$^{-1}$)

$\delta s\ CH_3$ (1381 cm$^{-1}$)

$\nu as\ O{-}C$ (1190 cm$^{-1}$)

Simultaneously, the absorption of carbonyl group attributed to TAIC was observed at 1700 cm$^{-1}$.

Next, each of the pulverized cured PPE resin compositions was immersed in deuterated chloroform (CDCl$_3$) at 23° C. for 12 hours, thereby extracting an chloroform extractable PPE resin component. The extract was introduced into sample tubes for an NMR analysis and subjected to $^1$H-NMR analysis. As a result, the presence of a PPE chain and two different allyl groups was confirmed in all of the cured PPE resin compositions. Of the two different allyl groups, one allyl group was well in agreement, in chemical shift, with that of the curable PPE resin used as a starting material for the cured PPE resin compositions, and another was well in agreement with that of TAIC. Characteristic peaks of the spectrum were as follows.

1.9–2.2 ppm (methyl group of PPE)
4.5 ppm (—CH*$_2$CH=CH$_2$ of TAIC)
4.8–5.0 ppm (—CH$_2$CH=CH*$_2$ of PPE)
5.2–5.4 ppm (—CH$_2$CH=CH*$_2$ of TAIC)
0 5.6–6.0 ppm (—CH$_2$CH*=CH$_2$ of TAIC and PPE)
6.3–6.6 ppm (phenyl group of PPE)

EXAMPLES 5 TO 8

Syntheses of curable PPE resins

An allyl group-substituted PPE-1 having an average substitution degree of 10% and a viscosity number ($\eta$sp/c) of 0.62 was prepared in the same manner as described in Example 2.

Curable PPE resin compositions

A film was produced from the allyl group-substituted PPE-1 in substantially the same manner as described in Examples 1 to 4 except that the ratio of the cured PPE resin to TAIC was changed as shown in Table 1. As a result, films each having a smooth and nonsticky surface were obtained. The thus obtained films were also excellent in storage stability and, therefore, when the films were allowed to stand at room temperature for three months, no gel formation occurred in these films.

Cured PPE resin compositions

In Examples 5 and 6, the films were subjected to heating under pressure in substantially the same manner as described in Example 1 to 4 except that the heating was conducted at 200° C. for 30 minutes. In Examples 7 and 8, the films were subjected to heating under pressure in the same manner as in Examples 1 to 4. Thus, there were obtained cured PPE resin compositions. Physical properties of each of the cured PPE resin compositions are shown in Table 2.

Each of the curable PPE resin composition films had low glass transition temperature and excellent fluidity when it was melted so that press molding thereof was readily performed. Further, the cured PPE resin composition films were also excellent in resistance to trichloroethylene and dielectric properties, i.e., dielectric constant and dielectric dissipation factor. In Examples 5 and 6, although the heating of the curable films under pressure was performed at relatively low temperature as compared to that employed in Examples 7 and 8, the curable films were readily molded into a film and the resultant cured film was excellent in resistance to trichloroethylene.

The cured PPE resin compositions were subjected to FT-IR analysis (diffuse reflectance method) and the deuterated chloroform extract of each of the cured PPE resin compositions was subjected to $^1$H-NMR analysis in substantially the same manner as described in Examples 1 and 4. The presence of a skeleton of PPE was confirmed by the FT-IR analysis and the cured compositions exhibited the peaks ascribed to the curable PPE resins and TAIC by $^1$H-NMR analysis.

EXAMPLES 9 AND 10

Syntheses of curable PPE resins 2,6-dimethylphenol was subjected to oxidative polymerization in the presence of 2,2-bis(3,5-dimethyl-4-hydroxyphenyl)propane, thereby obtaining a bifunctional PPE having a viscosity number of 0.40 as measured in a 0.5 g/dl chloroform solution at 30° C. (hereinafter referred to as "PPE-2"). Using the PPE-2, two different PPE's having average allyl group substitution degrees of 6% and 18%, respectively, were produced in substantially the same manner as described in Examples 1 to 4.

Curable PPE resin compositions

Substantially the same procedure as in Examples 1 to 4 was repeated except that each of the above-mentioned curable PPE resins was used and the formulation of the components was changed as shown in Table 1, to thereby obtain films each having a smooth and non-sticky surface. The thus obtained films were also excellent in storage stability. That is, when the films were allowed to stand at room temperature for three months, no gel formation occurred in the films.

Cured PPE resin compositions

From the above-obtained curable PPE resin composition films, cured PPE resin compositions were produced in substantially the same manner as in Examples 1 to 4, except that the heating under pressure was performed at 280° C. for 30 minutes in Example 9 and at 200° C. for 30 minutes in Example 10. Physical properties of each of the thus produced cured PPE resin compositions are shown in Table 2. Each of the curable PPE resin composition films had good moldability. Each of the cured PPE resin compositions was excellent in resistance to trichloroethylene, dielectric constant and dielectric dissipation factor.

Each of the cured PPE resin compositions was subjected to FT-IR analysis (diffuse reflectance method) in the same manner as in Examples 1 to 4, and the presence of a skeleton of PPE was confirmed. Further, the chloroform extract of each of the cured PPE resin compositions was subjected to $^1$H-NMR analysis in the same manner as in Examples 1 to 4, and it was confirmed that the cured resin composition exhibited the same peaks as those ascribed to the curable PPE resin and TAC. Characteristic peaks of the spectrum were as follows:
1.9 to 2.2 ppm (methyl group of PPE)
4.9 ppm ($-CH^*_2CH=CH_2$ of TAC),
4.8 to 5.0 ppm ($-CH_2CH=CH^*_2$ of PPE),
5.2 to 5.5 ppm ($-CH_2CH=CH^*_2$ of TAC),
5.6 to 5.9 ppm ($-CH_2CH^*=CH_2$ of PPE),
6.0 to 6.2 ppm ($-CH_2CH^*=CH_2$ of TAC), and
6.3 to 6.6 ppm (phenyl group of PPE).

COMPARATIVE EXAMPLES 1 TO 5

In Comparative Example 1, a resin composition was prepared using PPE-1 as it was without the substitution with an allyl group, in the same manner as in Examples 1 to 4. In Comparative Example 2, a resin composition was prepared using an allyl group-substituted PPE-1 having an average allyl group substitution degree of 0.05% prepared according to the method described in Example 2, in the same manner as in Examples 1 to 4. Each of the PPE resin compositions was subjected to film formation in the same manner as in Examples 1 to 4. However, no film was obtained due to occurrence of many small cracks. By changing the drying temperature from 23° C. to 50° C., films could be produced from the above-mentioned PPE resin compositions, but the films did not have a smooth surface. The thus obtained films were cured and the properties of the cured resin compositions were measured according to the method described in Example 1. The results are shown in Table 2. Due to an insufficient allyl group substitution or lack of allyl groups, the cured films of the Comparative Examples 1 and 2 showed poor trichloroethylene resistance as compared to those of the cured resin compositions of Examples 1 to 10.

In Comparative Examples 3 to 5, curable PPE resin compositions were produced in substantially the same manner as in Examples 5 to 8 except that the formulation of the curable PPE resin and TAIC were changed as shown in Table 1, and subjected to film casting in the same manner as in Examples 5 to 8. As a result, in Comparative Examples 3 and 4, curable films having a smooth and nonsticky surface were obtained, but in Comparative Example 5, a film could not be formed. The curable films of Comparative Examples 3 and 4 were cured in the same manner as in Examples 5 to 8 to form cured PPE resin compositions. The properties of the obtained cured PPE resin composition films are shown in Table 2. In Comparative Examples 3 and 4, the effect of TAIC was not exhibited or was insufficient and, therefore, the resistance to trichloroethylene was poor.

COMPARATIVE EXAMPLE 6

Substantially the same procedure as in Example 6 was repeated except that the heating of a curable film was conducted at 320° C. for 2 hours. The resultant cured resin composition had a chloroform extractable PPE resin component content of 0%, and the film was very brittle and hence was not suitable for practical use.

TABLE 1

| | Curable PPE | | | | Formulation of resin composition (wt. %) | | | Film-[b] forming properties | Glass transition temperature (°C.) | Stor-[c] age stability |
|---|---|---|---|---|---|---|---|---|---|---|
| | Q | Substituent | Average substitution degree (%) | ηsp/c | Curable PPE | TAIC or TAC | Initi-[a] ator | | | |
| Example 1 | H— | allyl | 5 | 0.59 | 90 | 10(TAIC) | 3 | ○ | 160 | ○ |
| Example 2 | | | 10 | 0.61 | | | | ○ | 145 | ○ |
| Example 3 | | | 18 | 0.47 | | | | ○ | 117 | ○ |
| Example 4 | | | 53 | 0.48 | | | | ○ | 113 | ○ |
| Example 5 | | | 10 | 0.62 | 95 | 5(TAIC) | 3 | ○ | 155 | ○ |
| Example 6 | | | | | 85 | 15(TAIC) | 3 | ○ | 140 | ○ |
| Example 7 | | | | | 60 | 40(TAIC) | 3 | ○ | 101 | ○ |
| Example 8 | | | | | 40 | 60(TAIC) | 3 | ○ | 85 | ○ |
| Example 9 | (bisphenol structure) | allyl | 6 | 0.43 | 80 | 20(TAC) | 3 | ○ | 149 | ○ |
| Example 10 | | | 18 | 0.39 | 90 | 10(TAC) | 3 | ○ | 140 | ○ |
| Comparative Example 1 | H— | allyl | 0 | 0.57 | 90 | 10(TAIC) | 3 | X | 160 | ○ |

TABLE 1-continued

| | Curable PPE | | | | Formulation of resin composition (wt. %) | | | Film-[b] forming properties | Glass transition temperature (°C.) | Stor-[c] age stability |
|---|---|---|---|---|---|---|---|---|---|---|
| | Q | Substituent | Average substitution degree (%) | ηsp/c | Curable PPE | TAIC or TAC | Initi-[a] ator | | | |
| Comparative Example 2 | | | 0.05 | 0.59 | 90 | 10(TAIC) | 3 | X | 158 | ◯ |
| Comparative Example 3 | | | 10 | 0.62 | 100 | 0 | 3 | ◯ | 177 | ◯ |
| Comparative Example 4 | | | | | 99 | 1(TAIC) | 3 | ◯ | 170 | ◯ |
| Comparative Example 5 | | | | | 30 | 70(TAIC) | 3 | X | —[d] | —[d] |

Note:
[a] As an initiator, 2,5-dimethyl-2,5-di(t-butylperoxy)hexyne-3 was used.
[b] ◯: Film having a smooth and nonsticky surface was obtained.
X: Film having a smooth and nonsticky surface was not obtained.
[c] ◯: Gel formation did not occur during the storage at room temperature for 3 months.
[d] Data could not be obtained due to poor film-forming properties of the resin composition.

TABLE 2

| | Curing temperature (°C.) | Chloroform extractable PPE resin component content (%) | Ratio of phenols to TAIC or TAC | Glass transition temperature (°C.) | Resistance to trichloroethylene | | Dielectric constant (1 MHz) | Dielectric dissipation factor (1 MHz) |
|---|---|---|---|---|---|---|---|---|
| | | | | | Weight increase (%) | Appearance[e] | | |
| Example 1 | 280 | 1.3 | 0.20 | 223 | 10.4 | o | 2.6 | $1.0 \times 10^{-3}$ |
| Example 2 | 280 | 1.0 | 0.19 | 219 | 12.8 | o | 2.6 | $1.0 \times 10^{-3}$ |
| Example 3 | 280 | 1.6 | 0.22 | 200 | 10.7 | o | 2.6 | $1.0 \times 10^{-3}$ |
| Example 4 | 280 | 1.5 | 0.14 | 205 | 9.7 | o | 2.7 | $2.0 \times 10^{-3}$ |
| Example 5 | 200 | 3.8 | 2.2 | 215 | 20.1 | o | 2.5 | $1.0 \times 10^{-3}$ |
| Example 6 | 200 | 3.0 | 3.9 | 206 | 11.3 | o | 2.6 | $1.0 \times 10^{-3}$ |
| Example 7 | 280 | 1.5 | 10.6 | 197 | 6.6 | o | 2.8 | $2.0 \times 10^{-3}$ |
| Example 8 | 280 | 1.0 | 35.2 | 190 | 6.3 | o | 2.9 | $3.0 \times 10^{-3}$ |
| Example 9 | 280 | 0.7 | 0.14 | 216 | 10.7 | o | 2.6 | $1.5 \times 10^{-3}$ |
| Example 10 | 200 | 3.7 | 5.2 | 200 | 12.1 | o | 2.6 | $1.5 \times 10^{-3}$ |
| Comparative Example 1 | 280 | 2.0 | 0.25 | 210 | 20.8 | x | 2.6 | $1.0 \times 10^{-3}$ |
| Comparative Example 2 | 280 | 2.1 | 0.27 | 214 | 19.4 | x | 2.6 | $1.0 \times 10^{-3}$ |
| Comparative Example 3 | 280 | 1.7 | 0 | 215 | 26.7 | x | 2.5 | $1.0 \times 10^{-3}$ |
| Comparative Example 4 | 280 | 0.9 | 0.03 | 213 | 25.3 | x | 2.5 | $1.0 \times 10^{-3}$ |

Note:
[e] o: Appearance was not changed.
x: The cured resin composition was swollen and warped.

EXAMPLES 11 TO 14

Synthesis of curable PPE resins

As representative examples of the curable PPE resins of formula (I), propargyl group-substituted PPE resins having average propargyl group substitution degrees and viscosity numbers shown in Table 3 were synthesized. The methods for synthesizing the resins are described below referring to the methods used in Examples 11 and 12.

In Example 11, 350 g of poly(2,6-dimethyl-1,4-phenylene ether) (hereinafter referred to as "PPE-3") having a viscosity number (ηsp/c) of 0.90 as measured in 0.5 g/dl chloroform solution at 30° C., was dissolved in 7.0 liters of tetrahydrofuran (THF). To the resultant solution was added 580 ml of n-butyl lithium solution (1.5 moles/liter in hexane), and the mixture was heated at 40° C. for 1 hour under an atmosphere of nitrogen gas to advance the reaction. Then, 103 g of propargyl bromide was added to the reaction mixture and stirred at 40° C. for 20 minutes. Subsequently, a mixture of 2.8 liters of water and 2.8 liters of methanol was added to the mixture, to form a precipitate. The precipitate was filtered off and washed with methanol. The filtration and washing with methanol of the precipitate were repeated 4 times and, then, the precipitate was dried under vacuum at 80° C. for 14 hours, thereby obtaining a white powder of propargyl group-substituted PPE-3. The average propargyl group substitution degree as determined by $^1$H-NMR was 6%. The viscosity number as measured in a 0.5 g/dl chloroform solution at 30° C. was 0.93.

In Example 12, an allyl group was introduced into PPE-3 by the same method as in Example 2 so that an allyl group-substituted PPE-3 having an average substitution degree of 11% was obtained. 220 g of allyl group-substituted PPE-3 was dissolved in 5.0 liters of chloroform. After the addition of 12 ml of bromine, the resultant mixture was stirred at room temperature for 30 minutes. Then, the reaction mixture was poured into 10 liters of methanol to form a precipitate. The precipitate was filtered off and washed with methanol. The filtration and washing with methanol were repeated 3 times, and the resultant precipitate was dried under vacuum for 14 hours at 80° C. The resultant white powder was dissolved in 8.0 liters of tetrahydrofuran (THF) and cooled to −15° C. Under an atmosphere of nitrogen, to the resultant solution was added 400 ml of a lithium diisopropylamide solution in THF (1.2 mole/liter) and the mixture was stirred for 20 minutes. The resultant reaction mixture was poured into 10 liters of methanol to form a precipitate. The precipitate was filtered off and washed with methanol. The filtration and methanol washing were repeated 4 times, and the precipitate was vacuum-dried at 80° C. for 14 hours. The results of the $^1$H-NMR measurement of the thus obtained precipitate showed that all of the allyl groups were converted into propargyl groups and the average substitution degree was 11%. The viscosity number of the propargyl group-substituted PPE-3 as measured in a 0.5 g/dl chloroform solution at 30° C. was 0.95.

In Examples 13 and 14, curable PPE resins were produced in the same manner as in Example 12.

Curable PPE resin composition

Using the above-obtained propargyl group-substituted PPE resins, curable PPE resin composition films were produced in the same manner as in Examples 1 to 4. All of the thus produced films had a smooth and nonsticky surface. In addition, no gelation occurred in these films when they were stored at room temperature for 3 months, showing that the films were excellent in storage stability.

Cured PPE resin composition

Each of the films prepared above was subjected to heating under pressure in substantially the same manner as in Examples 1 to 4 except that in Examples 12 and 13, heating was conducted at 200° C. for 60 minutes, and in Examples 11 to 14, heating was conducted at 280° C. for 30 minutes, to thereby obtain cured resin compositions. The properties of the cured resin compositions were determined by the same method as in Examples 1 to 4, and results are shown in Table 4. All of the curable resin compositions had excellent melt moldability, and the cured resin compositions had excellent trichloroethylene resistance and dielectric properties.

In order to identify the structure of each of the cured resin compositions, each of the cured resin compositions was analyzed by FT-IR (diffuse reflectance method) and the extract of each cured film with deuterated chloroform was analyzed by $^1$H-NMR in the same manners as in Examples 1 to 4.

The results of the FT-IR analysis showed the presence of the skeleton of a PPE. The results of the $^1$H-NMR analysis showed that the cured PPE resin composition contained the same structure as that of the original curable PPE resin and contained TAIC.

Characteristic peaks obtained by $^1$H-NMR analysis are as follows.
1.8–1.9 ppm (—CH$_2$C≡CH*)
1.9–2.2 ppm (—CH*$_3$)
2.3–2.5 ppm (—CH*$_2$C≡CH)
2.6–2.8 ppm (—CH*$_2$CH$_2$C≡CH)
6.3–6.7 ppm (Phenyl group)

EXAMPLES 15 TO 17

Synthesis of curable PPE resin

A bifunctional PPE having a viscosity number ($\eta$sp/c) of 0.21 as measured in a 0.5 g/dl chloroform solution at 30° C. (hereinafter referred to as "PPE-4") was obtained by oxidative polymerization of 2,6dimethylphenol in the presence of bis(3,5-dimethyl-4hydroxyphenyl)sulfone. This bifunctional PPE was subjected to substitution with a propargyl group in the same manner as in Example 12, thereby obtaining a PPE resin having an average substitution degree of 16%.

Curable PPE resin compositions

Substantially the same procedure as in Examples 1 to 4 was repeated except that the proportions of a propargyl group-substituted PPE resin and TAC were changed as shown in Table 3, to thereby obtain curable PPE resin composition films. The thus obtained curable films had a smooth and nonsticky surface. Further, no gel formation occurred in these films during the storage at room temperature for 3 months, showing that they were excellent in storage stability.

Cured PPE resin compositions

Each of the above-obtained curable films was subjected to heating under pressure in the substantially same manner as in Examples 1 to 4 except that in Example 15, heating was conducted at 280° C. for 30 minutes, and in Examples 16 and 17, heating was conducted at 200° C. for 1 hour, to thereby obtain cured PEP resin compositions. The properties of the cured PPE resin compositions were determined in the same manner as in Examples 1 to 4. The results are shown in Table 4. The curable films had excellent moldability, and the cured resin compositions had excellent trichloroethylene resistance and dielectric properties.

In order to identify the structure of each of the cured PPE resin compositions, the cured resin compositions were analyzed by FT-IR (diffuse reflectance method) and the extracts of the cured resin compositions with deuterated chloroform were analyzed by $^1$HNMR. The results of the FT-IR analysis showed the presence of the skeleton of a PPE. The results of the $^1$H-NMR analysis showed that the cured resin contained the same structure as that of the original curable PPE resin and contained the TAC.

COMPARATIVE EXAMPLES 7 TO 10

In Comparative Example 7, substantially the same procedure as in Example 11 was repeated except that a curable PPE resin having an average propargyl group substitution degree of 0.05% (synthesized by the method described in Example 11) was used as a curable PPE resin, to thereby obtain a curable PPE resin composition. The above-obtained PPE resin composition was poor in film-forming properties, and the cured resin composition produced therefrom was poor in trichloroethylene resistance.

In Comparative Example 8, substantially the same procedure as in Example 13 was repeated except that the heating of the curable film was conducted at 320° C. for 2 hours, to thereby obtain a cured resin composition. The resultant cured PPE resin composition had a chloroform extractable PPE resin component content of 0%. The cured resin composition was very brittle and, hence, it was not suitable for practical use.

The properties of the cured PPE resin compositions are collectively shown in Table 4.

resistance of the thus obtained cured PPE resin composition was poor, since TAC was not used.

The properties of the cured PPE resin composition films are collectively shown in Table 4.

TABLE 3

| | Curable PPE | | | | Formulation of resin composition (wt. %) | | | Film-[b] forming properties | Glass transition temperature (°C.) | Stor-[c] age stability |
|---|---|---|---|---|---|---|---|---|---|---|
| | Q | Substituent | Average substitution degree (%) | $\eta sp/c$ | Curable PPE | TAIC or TAC | Initi-[a] ator | | | |
| Example 11 | H— | propargyl | 6 | 0.93 | 90 | 10(TAIC) | 3 | ○ | 159 | ○ |
| Example 12 | | | 11 | 0.95 | | | | ○ | 147 | ○ |
| Example 13 | | | 17 | 0.88 | | | | ○ | 135 | ○ |
| Example 14 | | | 45 | 0.82 | | | | ○ | 120 | ○ |
| Comparative Example 7 | | | 0.05 | 0.91 | | | | X | 163 | ○ |
| Example 15 | (structure: bis-sulfonyl bridged dimethylphenyl) | propargyl | 16 | 0.24 | 95 | 5(TAC) | 3 | ○ | 151 | ○ |
| Example 16 | | | | | 80 | 20(TAC) | 3 | ○ | 138 | ○ |
| Example 17 | | | | | 60 | 40(TAC) | 3 | ○ | 95 | ○ |
| Comparative Example 9 | | | | | 100 | 0 | 3 | ○ | 171 | ○ |
| Comparative Example 10 | | | | | 30 | 70(TAC) | 3 | X | —[d] | —[d] |

Note:
[a] As an initiator, 2,5-dimethyl-2,5-di(t-butylperoxy)hexyne-3 was used.
[b] ○: Film having a smooth and nonsticky surface was obtained.
X: Film having a smooth and nonsticky surface was not obtained.
[c] ○: Gel formation did not occur during the storage at room temperature for 3 months.
[d] Data could not be obtained due to poor film-forming properties of the resin composition.

TABLE 4

| | Curing temperature (°C.) | Chloroform extractable PPE resin component content (%) | Ratio of phenols to TAIC or TAC | Glass transition temperature (°C.) | Resistance to trichloroethylene | | Dielectric constant (1 MHz) | Dielectric dissipation factor (1 MHz) |
|---|---|---|---|---|---|---|---|---|
| | | | | | Weight increase (%) | Appearance[e] | | |
| Example 11 | 280 | 1.2 | 0.19 | 228 | 11.2 | o | 2.6 | $1.0 \times 10^{-3}$ |
| Example 12 | 200 | 3.2 | 3.3 | 209 | 10.5 | o | 2.6 | $1.0 \times 10^{-3}$ |
| Example 13 | 200 | 2.9 | 4.0 | 207 | 11.6 | o | 2.6 | $1.0 \times 10^{3}$ |
| Example 14 | 280 | 1.4 | 0.15 | 202 | 9.6 | o | 2.7 | $2.0 \times 10^{-3}$ |
| Comparative Example 7 | 280 | 1.9 | 0.25 | 204 | 21.7 | x | 2.6 | $1.0 \times 10^{-3}$ |
| Example 15 | 280 | 1.5 | 0.21 | 194 | 12.9 | o | 2.6 | $1.0 \times 10^{-3}$ |
| Example 16 | 200 | 3.2 | 7.2 | 192 | 10.7 | o | 2.7 | $2.0 \times 10^{-3}$ |
| Example 17 | 200 | 3.7 | 16.9 | 187 | 11.4 | o | 2.8 | $2.0 \times 10^{-3}$ |
| Comparative Example 9 | 280 | 0.7 | 0 | 198 | 28.8 | x | 2.6 | $1.0 \times 10^{-3}$ |

Note:
[e] o: Appearance was not changed.
x: The cured resin composition was swollen and warped.

In Comparative Examples 9 and 10, curable PPE resin compositions were produced in substantially the same manner as in Examples 15 to 17 except that the formulation of the curable PPE resin and TAC were changed as shown in Table 3.

In Comparative Example 10, a nonsticky film having excellent handling properties was not obtained.

The curable films of Comparative Example of 9 were cured in the same manner as in Examples 15 to 17 to form a cured PPE resin composition. Trichloroethylene

EXAMPLES 18 TO 26

Curable composite materials

Composite materials comprising an allyl-group substituted PPE resin and either of a glass cloth and a quartz cloth as shown in Table 5 were produced. In Examples 18 to 25, the same curable PPE resins and the same formulations of resin compositions as in Examples 1 to 8, respecively, were employed. In Example 26, the same PPE resin and the same formulation of a resin composition as in Example 9 were employed. The method for producing the composite materials is described below referring to the method of Example 19. 200 g of an allyl group-substituted PPE-1 having an average substitution degree of 10% and a viscosity number ($\eta$sp/c) of 0.61, 22.2 g of TAIC, and 6.7 g of 2,5-dimethyl-2,5-di(t-butylperoxy)hexyne-3 (Perhexyne 25B, manufactured and sold by NIPPON OIL & FATS CO., LTD., Japan) as an initiator were dissolved in 1.0 liter of trichloroethylene, to thereby obtain a resin composition solution. A glass cloth of 105 g/m$^2$ was immersed in the above-obtained solution. The glass cloth was taken out and dried at 23° C. for 12 hours in air and further dried at 80° C. for 8 hours under vacuum to obtain a curable composite material. The glass cloth content of the resultant curable composite material was 50% by weight. This curable composite material had a smooth and nonsticky surface. This material was allowed to stand at room temperature for 3 months, but no gel formation occurred. This result shows that the curable composite material was excellent in storage stability. In Examples 18, 20 and 21, substantially the same procedure as in Example 19 was repeated except that curable PPE resins having different average substitution degrees shown in Table 5 were used. In Examples 22, 23 and 26, a glass having a weight of cloth of 48 g/m$^2$ was used instead of a glass cloth of 105 g/m$^2$ to obtain a curable composite material having a glass cloth content of 30% by weight. In Examples 24 and 25, a quartz cloth of 48 g/m$^2$ was used instead of glass cloth. In each case, the film-forming properties and storage stability of the curable resin compositions were excellent.

Cured composite materials and laminate structures 12 sheets of each of the above-obtained curable composite materials were piled up. On each surface of the resultant piled sheets, a copper foil having a thickness of 35 μm was disposed. The resultant material was subjected to heating by means of a press molding machine under a pressure of 100 kg/cm$^2$, followed by cooling, thereby obtaining a laminate structure having a thickness of about 1.6 mm. In Example 18, the heating was conducted in a manner such that the temperature was elevated from room temperature to 220° C. and kept at 220° C. for 30 minutes, and in Examples 19 to 25, the heating was conducted in a manner such that the temperature was elevated from room temperature to 200° C. and kept at 200° C. for 30 minutes. In Example 21, a copper foil was not used. In Example 26, the heating was conducted at 240° C. for 30 minutes under a pressure of 50 kg/cm$^2$ without the use of a copper foil. The properties of the above-obtained laminate structures and cured composite materials are summarized in Table 6. As shown in Table 6, they had excellent resistance to trichloroethylene, dielectric properties and heat resistance in solder bath. Each laminate structure exhibited excellent copper foil-peel strength.

The methods of measurement of the above-mentioned properties are as follows.

1. Resistance to Trichloroethylene

A sample having a size of 25 mm×25 mm was cut out from a laminate structure from which a copper foil had been removed. The sample was weighed, immersed in boiling trichloroethylene for 5 minutes, taken out and weighed. The weight increase of the sample was calculated from the following formula:

$$\text{Weight increase} = \frac{\text{weight after boiling} - \text{weight before boiling}}{\text{weight before boiling}} \times 100(\%).$$

The resistance to trichloroethylene was expressed in terms of the weight increase.

2. Dielectric constant and dielectric dissipation factor.

Measurements were conducted at 1 MHz in accordance with ASTM D150.

3. Heat resistance in solder bath

The heat resistance in solder bath was determined according to the method described in JIS (Japanese Industrial Standard) C6481. Illustratively stated, a sample having a size of 25 mm×25 mm was cut out from a laminate structure from which a copper foil had been removed. The sample was floated on a molten solder in a solder bath for 120 seconds, which molten solder was heated at 260° C. The appearance was examined by visual observation to determine whether or not any change occurred.

4. Copper foil-peel strength

From a laminate structure, a strip of 25 mm in width and 100 mm in length was cut out. On the copper foil, parallel grooves were provided at an interval of 10 mm. The copper foil between the neighboring grooves was peeled off continuously at a rate of 50 mm/min by a tensile machine in a direction perpendicular to the copper foil surface of the sample. The strength required to peel off the copper foil from the cured resin was measured.

EXAMPLES 27 TO 31

Curable composite materials

Curable composite materials were produced in substantially the same manner as in Examples 18 to 26, except that the curable PPE resins obtained in Examples 12, 13 and 15 to 17 and reinforcements shown in Table 5 were employed and the amounts of components were changed as shown in Table 5. Illustratively stated, in Examples 27 and 28, the same curable PPE resins as used in Examples 12 and 13 were employed, respectively. In Examples 29 to 31, the same curable PPE resins as used in Examples 15 to 17 were employed, respectively. In Examples 27 and 28, as a reinforcement, a glass cloth of 105 g/m$^2$ and a quartz cloth of 105 g/m$^2$ were respectively used as a reinforcement, and in Examples 29 to 31, a glass cloth of 48 g/m$^2$ was used.

Each of the resultant curable composite materials was excellent in film-forming properties and storage stability.

Cured composite materials and laminate structures

In Examples 29 and 30, cured composite materials were produced from the above-obtained curable composite materials in the same manner as in Examples 21 and 26 except that the heating of the curable materials was conducted under a pressure of 100 kg/cm$^2$ for a period of 30 minutes. In Examples 27, 28 and 31, laminate structures were produced from the above-obtained curable composite materials in substantially the same manner as in Examples 18 to 20 and 22 to 25 except that the heating of the curable materials and copper foils was conducted under a pressure of 100 kg/cm$^2$ for a period of 30 minutes. The heating temperatures employed are shown in Table 6. The properties of the thus produced cured composite materials and laminate structures were examined in the same manner as in Examples 18 to 26, and the results are shown in Table 6. In all of the Examples 27 to 31, the cured products were excellent in resistance to trichloroethylene, dielectrical properties and heat resistance in solder bath. Further, the laminate structures had good copper foil-peel strength.

TABLE 5

| | Curable PPE | | | | Formulation of resin composition (wt. %) | | | Reinforcement | | Film-[b] forming properties | Stor-[c] age stability |
|---|---|---|---|---|---|---|---|---|---|---|---|
| | Q | Substituent | Average substitution degree (%) | $\eta sp/c$ | Curable PPE | TAIC or TAC | Initi-[a] ator | Type | wt. % | | |
| Example 18 | H— | allyl | 5 | 0.59 | 90 | 10(TAIC) | 3 | glass cloth | 50 | ○ | ○ |
| Example 19 | | | 10 | 0.61 | | | | glass cloth | 50 | ○ | ○ |
| Example 20 | | | 18 | 0.47 | | | | glass cloth | 50 | ○ | ○ |
| Example 21 | | | 53 | 0.48 | | | | glass cloth | 50 | ○ | ○ |
| Example 22 | | | 10 | 0.62 | 95 | 5(TAIC) | 3 | glass cloth | 30 | ○ | ○ |
| Example 23 | | | | | 85 | 15(TAIC) | 3 | glass cloth | 30 | ○ | ○ |
| Example 24 | | | | | 60 | 40(TAIC) | 3 | quartz cloth | 30 | ○ | ○ |
| Example 25 | | | | | 40 | 60(TAIC) | 3 | quartz cloth | 30 | ○ | ○ |
| Example 26 | (structure with C(CH₃)₂ bridge, tetramethyl phenols) | allyl | 6 | 0.43 | 80 | 20(TAC) | 3 | glass cloth | 30 | ○ | ○ |
| Example 27 | H— | propargyl | 11 | 0.95 | 90 | 10(TAIC) | 3 | glass cloth | 50 | ○ | ○ |
| Example 28 | | | 17 | 0.88 | | | 3 | quartz cloth | 50 | ○ | ○ |
| Example 29 | (structure with SO₂ bridge, tetramethyl phenols) | propargyl | 16 | 0.24 | 95 | 5(TAC) | 3 | glass cloth | 30 | ○ | ○ |
| Example 30 | | | | | 80 | 20(TAC) | 3 | glass cloth | 30 | ○ | ○ |
| Example 31 | | | | | 60 | 40(TAC) | 3 | glass cloth | 30 | ○ | ○ |

Note:
[a] As an initiator, 2,5-dimethyl-2,5-di(t-butylperoxy)hexyne-3 was used.
[b] ○: Film having a smooth and nonsticky surface was obtained.
[c] ○: Gel formation did not occur during the storage at room temperature for 3 months.

TABLE 6

| | Curing temperature (°C.) | Copper foil | Resistance to trichloroethylene | | Dielectric constant (1 MHz) | Dielectric dissipation factor (1 MHz) | Heat resistance[f] in solder bath (260° C., 120 sec.) | Copper foil-peel strength (kg/cm) |
|---|---|---|---|---|---|---|---|---|
| | | | Weight increase (%) | Appearance[e] | | | | |
| Example 18 | 220 | used | 6.8 | ○ | 3.0 | $2.0 \times 10^{-3}$ | ○ | 1.5 |
| Example 19 | 200 | used | 3.0 | ○ | 3.0 | $2.0 \times 10^{-3}$ | ○ | 1.8 |
| Example 20 | 200 | used | 3.2 | ○ | 3.0 | $2.0 \times 10^{-3}$ | ○ | 1.9 |
| Example 21 | 200 | not used | 2.9 | ○ | 3.0 | $2.5 \times 10^{-3}$ | ○ | — |
| Example 22 | 200 | used | 6.4 | ○ | 2.8 | $2.0 \times 10^{-3}$ | ○ | 1.7 |
| Example 23 | 200 | used | 3.2 | ○ | 2.8 | $2.0 \times 10^{-3}$ | ○ | 1.7 |
| Example 24 | 200 | used | 2.1 | ○ | 2.9 | $2.5 \times 10^{-3}$ | ○ | 1.8 |
| Example 25 | 200 | used | 1.9 | ○ | 3.0 | $3.5 \times 10^{-3}$ | ○ | 1.6 |
| Example 26 | 240 | not used | 3.1 | ○ | 2.8 | $2.0 \times 10^{-3}$ | ○ | — |
| Example 27 | 220 | used | 3.0 | ○ | 3.0 | $2.0 \times 10^{-3}$ | ○ | 1.7 |
| Example 28 | 200 | used | 3.2 | ○ | 2.8 | $2.0 \times 10^{-3}$ | ○ | 1.9 |
| Example 29 | 280 | not used | 3.7 | ○ | 2.8 | $2.0 \times 10^{-3}$ | ○ | — |
| Example 30 | 280 | not used | 3.3 | ○ | 2.9 | $3.0 \times 10^{-3}$ | ○ | — |
| Example 31 | 200 | used | 3.8 | ○ | 3.0 | $3.0 \times 10^{-3}$ | ○ | 1.8 |

Note:
[e] ○: Appearance was not changed.
[f] ○: Appearance was not changed.

Of the laminate structures obtained in Examples 18 to 31, four laminate structures obtained in Examples 8, 23, 28 and 31 were subjected to measurement of tensile strength, flexural strength and linear expansion coefficient (along the directions of the X-Y axes and Z axis).

The tensile strength and flexural strength were determined according to the methods described in ASTM D638 and JIS C6481, respectively. The linear expansion coefficient was measured by means of a thermomechanical analyzer (TMA). The results are shown in Table 7. Each laminate structure had sufficient mechanical strength and excellent dimensional stability.

TABLE 7

|  | Tensile strength at break (kg/cm$^2$) | Flexural strength (kg/cm$^2$) | Coefficient of linear expansion (−30° C. to 30° C.) | | Coefficient of linear expansion (30° C. to 200° C.) | |
| --- | --- | --- | --- | --- | --- | --- |
|  |  |  | Direction of X, Y axes (cm/cm °C.) | Direction of Z axis (cm/cm °C.) | Direction of X, Y axes (cm/cm °C.) | Direction of Z axis (cm/cm °C.) |
| Example 18 | 1500 | 4300 | $15 \times 10^{-6}$ | $85 \times 10^{-6}$ | $15 \times 10^{-6}$ | $95 \times 10^{-6}$ |
| Example 23 | 1300 | 4000 | $15 \times 10^{-6}$ | $75 \times 10^{-6}$ | $15 \times 10^{-6}$ | $80 \times 10^{-6}$ |
| Example 28 | 1700 | 4500 | $15 \times 10^{-6}$ | $70 \times 10^{-6}$ | $15 \times 10^{-6}$ | $80 \times 10^{-6}$ |
| Example 31 | 1250 | 4000 | $15 \times 10^{-6}$ | $90 \times 10^{-6}$ | $20 \times 10^{-6}$ | $105 \times 10^{-6}$ |

EXAMPLE 32

On one surface of the curable resin composition film obtained in Example 2 (thickness: about 100 μm, a copper foil having a thickness of 18 μm was disposed. The resultant material was subjected to pressing under a pressure of 70 kg/cm$^2$ at 220° C. for 30 minutes, thereby curing the resin composition film and simultaneously bonding the resin composition film to the foil. Although no adhesive was used, the resultant laminate structure was excellent in the bonding strength of the copper foil layer and the cured resin composition layer, that is, the copper foil-peel strength was as large as 1.2 kg/cm or more. Further, the water absorption of the laminate structure was measured as follows. A sample having a size of about 50 mm × about 50 mm was cut out from a laminate structure, and the copper foil was removed from the sample. The weight of the resultant sample was measured. The sample was dipped in pure water and kept therein at 23° C. for 1 week. Then, the sample was taken out, and the water remaining on its surface was wiped off. The weight of the sample was measured immediately. The water absorption was calculated from the following formula.

$$\text{Water absorption} = \frac{\text{Weight after dipping} - \text{weight before dipping}}{\text{Weight before dipping}} \times 100(\%)$$

The laminate structure had low water absorption, that is, the water absorption was as low as 0.1% or less.

EXAMPLE 33

Two sheets of a copper foil having a thickness of 18 μm were respectively disposed on both surfaces of the resin composition film obtained in Example 6 (thickness: about 100 μm). The resultant material was subjected to pressing under a pressure of 70 kg/cm$^2$ at 200° C. for 30 minutes, thereby curing the resin composition film and simultaneously bonding the resin composition film to the foils. The resultant laminate structure had excellent bonding strength between the copper foil layer and the resin composition layer and low water absorption. That is, the laminate structure had a copper foil-peel strength of 1.2 kg/cm or more and a water absorption of 0.1% or less.

EXAMPLE 34

On one surface of the curable composite material obtained in Example 23 (thickness: about 110 μm), a copper foil having a thickness of 18 μm was disposed. The resultant material was subjected to pressing under a pressure of 70 kg/cm$^2$ at 220° C. for 1 hour, thereby curing the curable composite material and simultaneously bonding the composite material to the foil. The resultant laminate structure had excellent bonding strength between the copper foil layer and the cured resin composition layer and low water absorption. That is, the laminate structure had a copper foil-peel strength of 1.2 kg/cm or more and a water absorption of 0.1% or less. The laminate structure also had good flexural resistance, ensuring that it can be suitably used as a semirigid board.

EXAMPLE 35

A curable composite material was produced in substantially the same procedure as in Example 29 except that the total concentration of the components in the trichloroethylene solution used for impregnating in a glass cloth was decreased so that the glass cloth content in the resultant composite material became 70% by weight. The curable composite material had a thickness of about 80 μm. On one surface of the curable composite material, a copper foil having a thickness of 18 μm was disposed. The resultant material was subjected to pressing under a pressure of 70 kg/cm$^2$ at 220° C. for 1 hour, thereby curing the composite material and simultaneously bonding the composite material to the foil. The resultant laminate structure had excellent bonding strength between the copper foil layer and the cured resin composition layer and low water absorption. That is, the laminate structure had a copper foil-peel strength of 1.2 kg/cm or more and a water absorption of 0.1% or less. The laminate structure also had good flexural resistance, ensuring that it can be suitably used as a semirigid printed circuit board.

EXAMPLE 36

Substantially the same procedure as in Example 22 was repeated except that a glass cloth of 105g/m$^2$ was employed in place of the glass cloth of 48 g/m$^2$, thereby obtaining a curable composite material containing 50% by weight of glass cloth and having a thickness of about 150 μm. This curable composite material was disposed on a silicon steel plate having a thickness of 1.0 mm which had been subjected to surface treatment, i.e., abrasion, degreasing and etching. Then, a copper foil having a thickness of 35 μm was disposed on a surface of the curable composite material remote from the plate. The resultant structure was subjected to pressing under a pressure of 100 kg/cm$^2$ at 200° C. for 30 minutes. The resultant composite structure had a thermal resistivity of 39° C./W, showing that it had excellent heat dissipation properties as compared to that (60°

C./W) of a structure in which a silicon steel plate was not employed.

The thermal resistivity was measured by a method in which a circuit including a resistance chip of 100 Ω connected thereto by soldering was formed on a sample composite structure having a size of 35 mm×50 mm and electric voltage was applied to the circuit, followed by measurement of the increase in the temperature of the sample.

EXAMPLE 37

Substantially the same procedure as in Example 36 was repeated except that the curable PPE resin film obtained in Example 6 (thickness: about 100 μm) was employed in place of the curable composite material and that an aluminum plate having a thickness of 1.0 mm was employed in place of the silicon steel plate. The resultant composite structure had a thermal resistivity of 24° C./W, showing that it had excellent heat dissipation properties as compared to that (57° C./W) of a structure wherein no aluminum plate was employed.

EXAMPLE 38

Substantially the same procedure as in Example 36 was repeated except that the curable composite material obtained in Example 27 (thickness: about 150 μm) was employed and that an aluminum plate having a thickness of 1.0 mm was employed in place of the silicon steel plate. The resultant composite structure had a thermal resistivity of 25° C./W, showing that it had excellent heat dissipation properties.

EXAMPLES 39 TO 43

Synthesis of curable PPE resin

According to the method described in Example 2, there were synthesized an allyl group-substituted PPE-1 having an average allyl group substitution degree of 14% and an allyl group-substituted PPE-1 having an average allyl group substitution degree of 5%. The above-synthesized allyl group-substituted PPE-1's had viscosity numbers ($\eta$sp/c) of 0.61 and 0.58, respectively, as measured in a 0.5 g/dl chloroform solution at 30° C.

Curable fire-retardant PPE resin composition

One of the above-synthesized allyl group-substituted PPE-1's, TAIC or TAC, an initiator, a fire retardant and an auxiliary fire retardant were dissolved or uniformly dispersed in trichloroethylene according to the formulation shown in Table 8. From each of the resultant solutions, a film having a thickness of about 100 μm was prepared by a film casting method. As the initiator, the fire retardant and the auxiliary fire retardant, the following compounds were employed.

Initiator:
2,5-dimethyl-2,5-di(t-butylperoxy)hexyne-3
(Perhexyne 25B, manufactured and sold by
NIPPON OIL & FAT CO., LTD., Japan)

Fire retardant:

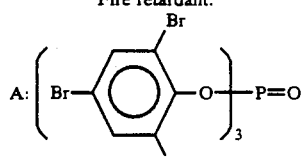

(PPX-33, manufactured and sold by

-continued
Daihachi Chemical Co., Ltd., Japan),

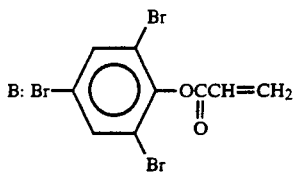

(SR-803, manufactured and sold by
Dai-ichi Kogyo Seiyaku Co., Ltd., Japan),

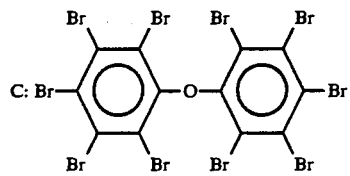

(AFR-1021, manufactured and sold by
Asahi Glass Co., Ltd., Japan),

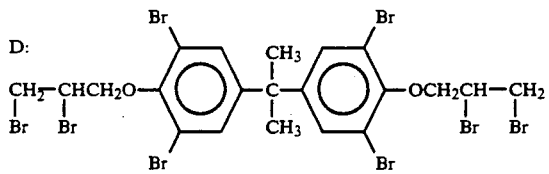

(D-5532, manufactured and sold by
Dai-ichi Kogyo Seiyaku Co., Ltd., Japan),

E: Red phosphorus-type fire retardant
(Novared 120 UF manufactured and sold by
Rin Kagaku Kogyo Co., Ltd., Japan)

Auxiliary fire retardant:

$Sb_2O_3$(PATOX-M manufactured and sold by
Nihon Seiko Co., Ltd., Japan)

The film-forming properties, storage stability and glass transition temperature of each of the above-prepared films were measured by the method described above. The results are shown in Table 8. Each film was excellent in film-forming properties and had a smooth and nonsticky surface. No gel formation occurred even when the film was allowed to stand at room temperature for 3 months, showing that the film had excellent storage stability.

Cured fire-retardant PPE resin composition 12 sheets of each of the above-obtained films were piled up and subjected to heating under pressure by means of a vacuum pressing machine while elevating the temperature from room temperature to 200° C. and maintaining the temperature for 30 minutes, followed by cooling, thereby obtaining a cured PPE resin composition having a thickness of 1 mm. Each of the curable fire-retardant PPE resin composition films could easily be molded since each film had low glass transition temperature and excellent flowability when it was melted. The properties of the thus obtained cured fire-retardant PPE resin compositions are shown in Table 9.

Measurements of the properties were conducted in the same manner as in Examples 1 to 4. Measurement of fire retardance was conducted using a test sample having a length of 127 mm and a width of 12.7 mm, according to the test method of UL-94 described below.

Fire retardance

The fire retardance of each of the above-prepared specimens having a size of 127 mm × 12.7 mm was measured in accordance with the method of Vertical Burning Test for Classifying Materials 94V-0, 94V-1 or 94V-2, described in UL-Subject 94, pages 7 to 10 dated Jan. 28, 1980, published by Underwriters Laboratories Inc., U.S.A. The classification into materials 94V-0, 94V-1, 4V-2 and 94HB (hereinafter simply referred to as "V-0", "V-1", "V-2" and "HB", respectively) is conducted according to the following criteria.

(i) A material classified as V-0 shall:
  A. Not have any specimens that burn with flaming combustion for more than 10 seconds after either application of the test flame.
  10 B. Not have a total flaming combustion time exceeding 50 seconds for the 10 flame applications for each set of five specimens.
  C. Not have any specimens that burn with flaming or glowing combustion up to the holding clamp.
  D. Not have any specimens that drip flaming particles that ignite the dry absorbent surgical cotton located 12 inches (305 mm) below the test specimen.
  E. Not have any specimens with glowing combustion that persists for more than 30 seconds after the second removal of the test flame.

(ii) A material classified as V-1 shall:
  A. Not have any specimens that burn with flaming combustion for more than 30 seconds after either application of the test flame.
  B. Not have a total flaming combustion time exceeding 250 seconds for the 10 flame applications for each set of five specimens.
  C. Not have any specimens that burn with flaming or glowing combustion up to the holding clamp.
  D. Not have any specimens that drip flaming particles that ignite the dry absorbent surgical cotton located 12 inches (305 mm) below the test specimen.
  E. Not have any specimens with glowing combustion that persists for more than 60 seconds after the second removal of the test flame.

(iii) A material classified as V-2 shall:
  A. Not have any specimens that burn with flaming combustion for more than 30 seconds after either application of the test flame.
  B. Not have a total flaming combustion time exceeding 250 seconds for the 10 flame applications for each set of five specimens.
  C. Not have any specimens that burn with flaming or glowing combustion up to the holding clamp.
  20 D. Be permitted to have specimens that drip flaming particles that ignite the dry absorbent surgical cotton placed 12 inches (305 mm) below the test specimen.
  E. Not have any specimens with glowing combustion that persists for more than 60 seconds after the second removal of the test flame.

(iv) A material classified as HB:
  More flammable than that of Class V-2.

All of the cured films of Examples 39 to 43 had excellent fire retardance, trichloroethylene resistance and dielectric properties.

The structural analysis of each of the cured resin composition films was conducted by FT-IR and $^1$H-NMR in the same manner as in Examples 1 to 4, 9 and 10, and the results were the same as those obtained in Examples 1 to 4, 9 and 10. Further, each film was also analyzed by pyrolysis gas chromatography in the same manner as in Example 1. The results are shown in Table 9.

Since the above-obtained cured PPE resin compositions contained a fire retardant, they exhibited excellent fire retardance, that is, the cured PPE resin compositions were classified into classes V-1 or V-0 according to the method described above, differing from the cured PPE resin compositions of Examples 1 to 10 containing no fire retardant, which were classified into class HB.

EXAMPLES 44 TO 46

Synthesis of curable PPE resins

According to the method described in Examples 11 and 12, there were synthesized a propargyl group-substituted PPE-1 having an average propargyl group substitution degree of 6% and a propargyl group-substituted PPE-1 having an average propargyl group substitution degree of 13%. The above-synthesized PPE-1's had viscosity numbers ($\eta$sp/c) of 0.64 and 0.63, respectively, as measured in a 0.5 g/dl chloroform solution at 30° C.

Curable fire-retardant resin compositions and cured fire-retardant resin compositions Using the above-obtained PPE-1's, curable fire-retardant PPE resin compositions were produced according to the formulations shown in Table 8. The fire retardant F used in Example 45 had the following formula:

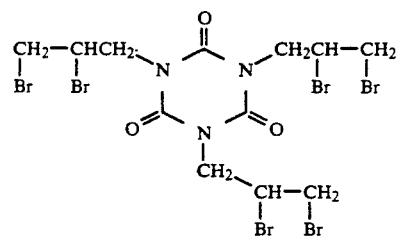

(AFR-1002, manufactured and sold by Asahi Glass Co., Ltd., Japan).

Then, from the curable fire-retardant PPE resin compositions, cured fire-retardant PPE resin compositions were produced in substantially the same manner as in Examples 39 to 43.

The properties of the curable fire-retardant resin composition and the cured fire-retardant composite materials were determined by the methods described in Examples 1 and 18.

The results are shown in Table 8 and Table 9.

As apparent from the Tables, all of the curable fire-retardant resin compositions obtained in Examples 44 to 46 had excellent film-forming properties and storage stability. Further, these curable fire-retardant resin compositions, after curing, exhibited excellent fire retardance, resistance to trichloroethylene and dielectric properties.

Further, each of the cured fire-retardant resin compositions was analyzed by FT-IR, $^1$H-NMR and pyrolysis gas chromatography in the same manner as described in Examples 1 to 4 and 11 to 14. The cured fire-retardant resin compositions exhibited substantially the same results as those of the cured PPE resin composition of Example 11.

Since the above-obtained, cured fire-retardant resin compositions contained a fire retardant, they exhibited excellent fire retardance, that is, the cured fire-retardant resin compositions were respectively classified into classes V-1 and V-0 according to the criteria described above, differing from the cured PPE resin compositions of Examples 11 to 17 containing no fire retardant, which were classified into class HB.

(thickness of about 100 μm), to thereby obtain a laminate structure.

Although an adhesive was not used, the above-obtained laminate structure had a copper-peel strength as high as 1.2 kg/cm or more. Further, the laminate structures had a water adsorption as low as 0.1% or less.

EXAMPLE 49

TABLE 8

| | Curable PPE | | | Formulation of resin composition (wt. %) | | | | | | | |
|---|---|---|---|---|---|---|---|---|---|---|---|
| | Substituent | Average substitution degree (%) | $\eta sp/c$ | Curable PPE | TAIC or TAC | Initiator[a] | Fire retardant[g] | Auxiliary fire retardant ($Sb_2O_3$) | Film-forming properties[b] | Glass transition temperature (°C.) | Storage stability[c] |
| Example 39 | allyl | 14 | 0.61 | 95 | 5(TAC) | 3 | 10 (A) | 0 | ○ | 150 | ○ |
| Example 40 | | | | 85 | 15(TAIC) | 3 | 10 (B) | 0 | ○ | 141 | ○ |
| Example 41 | | | | 70 | 30(TAIC) | 3 | 10 (C) | 2 | ○ | 130 | ○ |
| Example 42 | | | | 60 | 40(TAC) | 3 | 20 (D) | 5 | ○ | 105 | ○ |
| Example 43 | | 5 | 0.58 | 90 | 10(TAC) | 3 | 2 (E) | 0 | ○ | 165 | ○ |
| Example 44 | pro-pargyl | 13 | 0.63 | 95 | 5(TAC) | 3 | 10 (B) | 0 | ○ | 154 | ○ |
| Example 45 | | | | 70 | 30(TAIC) | 3 | 15 (F) | 0 | ○ | 125 | ○ |
| Example 46 | | 6 | 0.64 | 80 | 20(TAIC) | 3 | 5 (E) | 0 | ○ | 135 | ○ |

Note:
[a]As an initiator, 2,5-dimethyl-2,5-di(t-butylperoxy)hexyne-3 was used.
[b]○: Film having a smooth and nonsticky surface was obtained.
[c]○: Gel formation did not occur during the storage at room temperature for 3 months.
[g]The structures of fire retardants A to F are shown hereinbefore.

TABLE 9

| | Curing conditions | | Chloroform extractable PPE resin component content (%) | Ratio of phenols to TAIC or TAC | Heat resistance in solder bath (260° C., 120 sec.)[f] | Resistance to trichloroethylene | | Fire retardance (UL-94) | Dielectric constant (1 MHz) | Dielectric dissipation factor (1 MHz) |
|---|---|---|---|---|---|---|---|---|---|---|
| | Temperature (°C.) | Time (minute) | | | | Weight increase (%) | Appearance[e] | | | |
| Example 39 | 200 | 30 | 4.2 | 2.4 | ○ | 18.7 | ○ | V-1 | 2.6 | $1.0 \times 10^{-3}$ |
| Example 40 | 200 | 30 | 3.2 | 3.7 | ○ | 6.0 | ○ | V-0 | 2.6 | $1.0 \times 10^{-3}$ |
| Example 41 | 200 | 30 | 3.2 | 11.5 | ○ | 11.1 | ○ | V-0 | 2.7 | $2.0 \times 10^{-3}$ |
| Example 42 | 200 | 30 | 3.6 | 16.7 | ○ | 6.7 | ○ | V-0 | 2.8 | $2.5 \times 10^{-3}$ |
| Example 43 | 200 | 30 | 1.3 | 0.21 | ○ | 12.1 | ○ | V-1 | 2.6 | $1.0 \times 10^{-3}$ |
| Example 44 | 200 | 30 | 3.9 | 2.2 | ○ | 17.2 | ○ | V-0 | 2.6 | $1.0 \times 10^{-3}$ |
| Example 45 | 200 | 30 | 3.2 | 12.4 | ○ | 11.3 | ○ | V-1 | 2.7 | $2.0 \times 10^{-3}$ |
| Example 46 | 200 | 30 | 3.6 | 7.2 | ○ | 10.7 | ○ | V-1 | 2.6 | $1.0 \times 10^{-3}$ |

Note:
[e]○: Appearance was not changed.
[f]○: Appearance was not changed.

EXAMPLE 47

A copper foil having a thickness of 18 μm was disposed on one surface of a film (thickness of about 100 μm) of the curable fire-retardant resin composition obtained in Example 40, and subjected to press-molding by means of a pressing machine under a pressure of 70 kg/cm² at 200° C. for 30 minutes, to thereby cure the curable fire-retardant resin composition and simultaneously bond the copper foil to the surface of the cured fire-retardant resin composition. Thus, there was obtained a laminate structure.

Although an adhesive was not used, the above-obtained laminate structure had a copper foil-peel strength as high as 1.2 kg/cm or more. Further, the laminate structures had a water adsorption as low as 0.1% or less.

EXAMPLE 48

Substantially the same procedure as in Example 47 was repeated except that two copper foils were respectively disposed on both surfaces of the curable fire-retardant resin composition obtained in Example 46

Composite structure

A film having a thickness of about 100 μm of the curable fire-retardant resin composition obtained in Example 40 was disposed on one surface of an aluminum plate having a thickness of 1.0 mm which had been subjected to surface treatment, i.e., abrasion, degreasing and etching. Then, a copper foil having a thickness of 35 μm was disposed on the surface of the film, which surface was opposite to the surface facing the aluminum plate. The resultant material was subjected to press-molding by means of a pressing machine under a pressure of 70 kg/cm² at 200° C. for 30 minutes, to thereby obtain a composite structure. The thermal resistivity of the composite structure measured according to the method as described in Example 36 was 23° C./W. On the other hand, the thermal resistivity of the laminate structure prepared from the same curable fire-retardant composite material and copper foil as described above without using an aluminum plate was 60° C./W. The above results show that the composite structure was excellent in heat dissipation.

EXAMPLE 50

Substantially the same procedure as in Example 49 was repeated except that a film having a thickness of about 110 μm of the curable fire-retardant resin composition obtained in Example 45 was used and a silicon steel plate having a thickness of 1.0 mm was used instead of the aluminum plate, to thereby obtain a composite structure. The thermal resistivity of the composite structure measured according to the method described in Example 36 was 35° C./W. On the other hand, the thermal resistivity of the laminate structure prepared from the same curable fire-retardant composite material and copper foil as described above without using any silicon steel plate was 60° C./W. The above results show that the composite structure was excellent in heat dissipation.

EXAMPLES 51 TO 59

Syntheses of curable PPE resins

Substantially the same procedures as in Example 2 were repeated, to thereby obtain allyl group-substituted PPE-1's each having an average substitution degree of 5% (Example 58), 13% (Examples 51 to 57) and 30% (Example 59), respectively. The viscosity numbers ($\eta sp/c$) of the PPE-1's were 0.50 (Example 59), 0.58 (Example 58) and 0.59 (Examples 51 to 57), respectively.

Curable fire-retardant composite material

Using the above-obtained allyl group-substituted PPE-1's and a reinforcement, different curable fire-retardant composite materials having the formulation shown in Table 10 were produced. As a fire retardant, the following materials were used.

(1) Hexabromodiphenyl ether (Planeron HB-60P, manufactured and sold by Mitsui Toatsu Chemicals, Inc., Japan)

(2) Octabromodiphenyl ether (Saytex 111, manufactured and sold by Ethyl Corporation, U.S.A.)

(3) Decabromodiphenyl ether (AFR 1021, manufactured and sold by Asahi Glass Co., Ltd., Japan).

In Example 51, 200 g of the allyl group-substituted PPE-1 having an average substitution degree of 13%, 10.5 g of TAIC, 6.3 g of 2,5-dimethyl-2,5-di(t-butylperoxy)hexyne-3 (an initiator manufactured and sold by Nippon Oil and Fats Co., Ltd., Japan), 21.1 g of tetrabromodiphenyl ether (Pyroguard SR 900, manufactured and sold by Dai-ichi Kogyo Seiyaku Co., Ltd., Japan) and 4.2 g of $Sb_2O_3$ (PATOX-M, manufactured and sold by Nihon Seiko, Japan) were dissolved in 1.0 liter of trichloroethylene. A glass cloth of 48 g/m² was dipped in the mixture to impregnate the mixture in the glass cloth, and air-dried at 23° C. for 12 hours and, then, further vacuum-dried at 80° C. for 8 hours. The thus obtained curable fire-retardant composite material had a reinforcement (glass cloth) content of 35% by weight. The fire-retardant composite material had a smooth and nonsticky surface. The composite material was stored at room temperature for 3 months, but gel formation did not occur, showing that the composite material was excellent in storage stability.

In Examples 52 to 59, curable fire-retardant composite materials were produced in substantially the same manner as in Example 51, except that the formulation of the resin composition was changed as shown in Table 10 below.

Each of the fire-retardant composite materials was examined with respect to film-forming properties and storage stability in the same manner as in Example 1. All of the thus obtained curable fire-retardant composite materials had excellent film-forming properties and storage stability.

Cured fire-retardant composite material and laminate structure

In Example 51, 12 sheets of the above-obtained curable fire-retardant composite material were piled up. Two copper foils having a thickness of 35 μm were, respectively, disposed on both surfaces of the piled composite material. The resultant material was subjected to press-molding by means of a pressing machine under a pressure of 100 kg/cm² while elevating the temperature from room temperature to 200° C. and maintaining 200° C. for 30 minutes, and cooled. Thus, a laminate structure having a thickness of about 1.6 mm was obtained.

In Examples 52 to 59, substantially the same procedures as in Example 51 were repeated, except that in Examples 57 and 58, the copper foil was not used and the curing temperature and time were changed to 240° C. and 30 minutes, respectively, and that in Example 59, the curing temperature and time were changed to 200° C. and 60 minutes, respectively, to thereby obtain cured fire-retardant composite materials and laminate structures each having a thickness of about 1.6 mm.

The properties of each of the thus obtained cured fire-retardant composite materials and laminate structures were determined by the methods described in Examples 1 and 18.

Further, specimens having a size of 127 mm × 12.7 mm were cut off from the above-obtained cured fire-retardant composite materials and laminate structures, and the fire retardance of the specimens was determined according to the method described above.

The results are shown in Table 11.

As apparent from the Table, all of the cured fire-retardant composite materials and laminate structures had excellent fire retardance, resistance to trichloroethylene, dielectric properties, heat resistance in solder bath and copper foil-peel strength.

Further, each of the cured fire-retardant composite materials and the laminate structures was analyzed by FT-IR, ¹H-NMR and pyrolysis gas chromatography in the same manners as described in Examples 1 to 4, 9 and 10. The cured fire-retardant composite materials and laminate structures exhibited substantially the same results as those of the cured PPE resin composition of Examples 1 to 4, 9 and 10.

Since the above-obtained cured fire-retardant composite materials and laminate structures contained a fire retardant, they exhibited excellent fire retardance, that is, the cured composite materials and the laminate structures were respectively classified into classes V-1 and V-0 according to the criteria described above, differing from the cured composite materials and laminate structures of Examples 18 to 26 containing no fire retardant, which were classified into class HB. Examples 60 and 61.

Syntheses of curable PPE resins

Substantially the same procedure as in Example 11 was conducted except that PPE-1 was used instead of PPE-3, to thereby obtain a propargyl group-substituted PPE-1 having an average substitution degree of 11% and a viscosity number (ηsp/c) of 0.63.

On the other hand, substantially the same procedure as in Example 12 was repeated except that PPE-2 was used instead of PPE-3, to thereby obtain a propargyl group-substituted PPE-2 having an average substitution degree of 6% and a viscosity number (ηsp/c) of 0.43.

Curable fire-retardant composite material

In Example 60, a fire-retardant composite material was produced in substantially the same manner as in Example 51 using as a reinforcement a glass cloth of 48 g/m², except that the above-obtained propargyl group-substituted PPE-1 was used as a curable PPE instead of an allyl group-substituted PPE-1 and that the formulation of a resin composition was changed as shown in Table 10 below. The thus obtained fire-retardant composite material had a reinforcement content of 20% by weight.

In Example 61, another fire-retardant composite material was produced in substantially the same manner as in Example 51 except that the above-obtained propargyl group-substituted PPE-2 was used instead of the allyl group-substituted PPE-1 and the formulation of a resin composition was changed as shown in Table 10, and that a quartz cloth of 48 g/m² was used as a reinforcement instead of the glass cloth of 48 g/m². The thus obtained fire-retardant composite material had a reinforcement content of 35% by weight.

Each of the fire-retardant composite materials was examined with respect to film-forming properties and storage stability in the same manner as in Example 1. Both the composite materials had excellent film-forming properties and storage stability.

Cured fire-retardant composite material and laminate structure

12 Sheets of the curable fire-retardant composite material of Example 60 were piled up. The piled material was subjected to press-molding by means of a pressing machine under a pressure of 100 kg/cm² while elevating the temperature from room temperature to 240° C. and maintaining 240° C. for 30 minutes, and cooled. Thus, a cured fire-retardant composite material was obtained.

On the other hand, 12 sheets of the curable fire-retardant composite material of Example 61 were piled up. A copper foil having a thickness of 35 μm was disposed on each surface of the piled composite material. The resultant piled material was subjected to press-molding by means of a pressing machine under a pressure of 70 kg/cm² while elevating the temperature from room temperature to 200° C. and maintaining 200° C. for 30 minutes, and cooled. Thus, a laminate structure was obtained.

The properties of each of the thus obtained cured fire-retardant composite material and laminate structure were determined in the same manners as described in Examples 1 and 18. Results are shown in Table 11.

Further, each of the cured fire-retardant composite material and the laminate structure was analyzed by FT-IR, ¹H-NMR and pyrolysis gas chromatography in the same manners as described in Examples 1 to 4 and 11 to 14. The cured fire-retardant composite material of Example 60 and the laminate structure of Example 61 exhibited the same results as those of the cured PPE resin composition of Examples 1 to 4 and 11 to 14.

Since the above-obtained cured composite material and laminate structure contained a fire retardant, they exhibited excellent fire retardance, that is, the cured PPE resin composition and the laminate structure were respectively classified into classes V-1 and V-0 according to the criteria described above, differing from the cured composite materials and laminate structures of Examples 27 to 31 containing no fire retardant, which were classified into class HB.

TABLE 10

| | Curable PPE | | | Formulation of resin composition (wt. %) | | | | | | | | |
| | Substituent | Average substitution degree (%) | ηsp/c | Curable PPE | TAIC or TAC | Initiator[a] | Bromodiphenyl ether (Number of bromine atom) | $Sb_2O_3$ | Reinforcement | | Film-forming properties[b] | Storage stability[c] |
| | | | | | | | | | Type | wt. % | | |
|---|---|---|---|---|---|---|---|---|---|---|---|---|
| Example 51 | allyl | 13 | 0.59 | 95 | 5(TAIC) | 3 | 10 (tetra) | 2 | glass cloth | 35 | o | o |
| Example 52 | | | | 85 | 15(TAIC) | 3 | 5 (tetra) | 1 | glass cloth | 50 | o | o |
| Example 53 | | | | 85 | 15(TAIC) | 3 | 15 (tetra) | 3 | glass cloth | 40 | o | o |
| Example 54 | | | | 85 | 15(TAIC) | 3 | 10 (hexa) | 2 | glass cloth | 35 | o | o |
| Example 55 | | | | 85 | 15(TAIC) | 3 | 10 (octa) | 2 | glass cloth | 50 | o | o |
| Example 56 | | | | 85 | 15(TAIC) | 3 | 10 (deca) | 2 | glass cloth | 35 | o | o |
| Example 57 | | | | 80 | 20(TAC) | 3 | 5 (deca) | 3 | glass cloth | 35 | o | o |
| Example 58 | | 5 | 0.58 | 70 | 30(TAC) | 3 | 15 (octa) | 5 | quartz cloth | 35 | o | o |
| Example 59 | | 30 | 0.50 | 90 | 10(TAIC) | 3 | 15 (hexa) | 5 | glass cloth | 70 | o | o |
| Example 60 | propargyl | 11 | 0.63 | 80 | 20(TAIC) | 3 | 10 (tetra) | 2 | glass cloth | 20 | o | o |
| Example 61 | | 6 | 0.43 | 60 | 40(TAC) | 3 | 20 (octa) | 6 | quartz cloth | 35 | o | o |

Note:
[a] As an initiator, 2,5-dimethyl-2,5-di(t-butylperoxy)hexyne-3 was used.
[b] o: Film having a smooth and nonsticky surface was obtained.
[c] o: Gel formation did not occur during the storage at room temperature for 3 months.

TABLE 11

| | Curing conditions Temperature (°C.) | Time (minute) | copper foil | Chloroform extractable PPE resin component content (%) | Ratio of phenols to TAIC or TAC | Heat resistance in solder bath (260° C., 120 sec.) | Resistance to trichloroethylene Weight increase (%) | Appearance[e] | Fire retardance (UL-94) | Dielectric constant (1 MHz) | Dielectric dissipation factor (1 MHz) | Copper foil-peel strength (kg/cm) |
|---|---|---|---|---|---|---|---|---|---|---|---|---|
| Example 51 | 200 | 30 | used | 4.0 | 2.3 | ○ | 5.4 | ○ | V-0 | 2.8 | $2.0 \times 10^{-3}$ | 1.5 |
| Example 52 | 200 | 30 | used | 3.0 | 3.6 | ○ | 2.9 | ○ | V-1 | 3.0 | $2.0 \times 10^{-3}$ | 1.8 |
| Example 53 | 200 | 30 | used | 3.1 | 4.2 | ○ | 4.2 | ○ | V-0 | 2.9 | $2.0 \times 10^{-3}$ | 1.7 |
| Example 54 | 200 | 30 | used | 2.9 | 4.0 | ○ | 3.7 | ○ | V-0 | 2.8 | $2.0 \times 10^{-3}$ | 1.8 |
| Example 55 | 200 | 30 | used | 2.9 | 3.7 | ○ | 3.9 | ○ | V-0 | 3.0 | $2.0 \times 10^{-3}$ | 1.7 |
| Example 56 | 200 | 30 | used | 3.0 | 3.5 | ○ | 4.5 | ○ | V-0 | 2.8 | $2.0 \times 10^{-3}$ | 1.6 |
| Example 57 | 240 | 30 | not used | 2.7 | 3.8 | ○ | 4.7 | ○ | V-1 | 2.8 | $2.0 \times 10^{-3}$ | — |
| Example 58 | 240 | 30 | not used | 2.4 | 11.8 | ○ | 1.8 | ○ | V-0 | 2.7 | $3.0 \times 10^{-3}$ | — |
| Example 59 | 200 | 60 | used | 3.7 | 3.4 | ○ | 4.3 | ○ | V-0 | 3.6 | $4.0 \times 10^{-3}$ | 1.6 |
| Example 60 | 240 | 30 | not used | 3.0 | 4.1 | ○ | 3.5 | ○ | V-1 | 2.7 | $1.5 \times 10^{-3}$ | — |
| Example 61 | 200 | 30 | used | 3.8 | 17.5 | ○ | 3.1 | ○ | V-0 | 2.7 | $3.0 \times 10^{-3}$ | 1.5 |

Note:
[e]○: Appearance was not changed.

Of the cured fire-retardant composite materials and laminate structures prepared in Examples 51 to 61, the laminate structures of Examples 53, 56 and 61 were subjected to measurement of tensile strength at break, flexural strength and coefficient of linear expansion in the same manner as described in Example 18. Results are shown in Table 12. As apparent from Table 12, these laminate structures had excellent mechanical strength and dimensional stability.

TABLE 12

| | Tensile strength at break (kg/cm²) | Flexural strength (kg/cm²) | Coefficient of linear expansion (−30° C. to 30° C.) | | Coefficient of linear expansion (30° C. to 200° C.) | |
|---|---|---|---|---|---|---|
| | | | Direction of X, Y axes (cm/cm °C.) | Direction of Z axis (cm/cm °C.) | Direction of X, Y axes (cm/cm °C.) | Direction of Z axis (cm/cm °C.) |
| Example 53 | 1400 | 4200 | $15 \times 10^{-6}$ | $80 \times 10^{-6}$ | $15 \times 10^{-6}$ | $90 \times 10^{-6}$ |
| Example 56 | 1800 | 4500 | $15 \times 10^{-6}$ | $75 \times 10^{-6}$ | $15 \times 10^{-6}$ | $80 \times 10^{-6}$ |
| Example 61 | 1500 | 4300 | $15 \times 10^{-6}$ | $80 \times 10^{-6}$ | $15 \times 10^{-6}$ | $90 \times 10^{-6}$ |

EXAMPLE 62

A copper foil having a thickness of 18 μm was disposed on one surface of the curable fire-retardant composite material (thickness: about 100 μm) obtained in Example 53, and subjected to press-molding under a pressure of 70 kg/cm² at 200° C. for 30 minutes, to thereby cure the curable composite material and simultaneously bond the copper foil to the cured composite material. Thus, there was obtained a laminate structure. The laminate structure had a copper foil-peel strength as high as 1.2 Kg/cm or more and a water absorption as low as 0.1% or less. Further, the laminate structure had a flexural strength satisfactory for use as a semirigid printed circuit board in the field of electronics.

EXAMPLES 63 AND 64

Composite structure

In Example 63, the curable fire-retardant composite material (thickness: about 110 μm) obtained in Example 56 was disposed on one surface of an aluminum plate having a thickness of 1.0 mm, which had been subjected to surface treatment, i.e., abrasion, degreasing and etching. Further, a copper foil having a thickness of 35 μm was disposed on the surface of the curable fire-retardant composite material, which surface was opposite to the surface facing the aluminum plate. The resultant material comprising the copper foil, the curable fire-retardant composite material and the aluminum plate was subjected to press-molding by a pressing machine under a pressure of 70 kg/cm² at 200° C. for 60 minutes, to thereby obtain a composite structure. In Example 64, substantially the same procedure as mentioned just above was repeated except that the curable fire-retardant composite material (thickness: about 120 μm) obtained in Example 60 was used instead of the curable fire-retardant composite material (thickness: about 110 μm) obtained in Example 56, to thereby obtain a composite structure. The thermal resistivity of each of the composite structures measured according to the method described in Example 36 was 24° C./W. On the other hand, a laminate structure prepared from the same curable fire-retardant composite material and copper foil as described above without using the aluminum plate had a thermal resistivity of 58° C./W.

The above-mentioned results show that the composite structure of the present invention was excellent in heat dissipation.

EXAMPLES 65 TO 72

Syntheses of curable PPE resins

Two types of allyl group-substituted PPE-1's having average substitution degrees of 14% and 7%, respectively, were prepared in the same manner as in Example 2. The obtained allyl group-substituted PPE-1's had viscosity numbers (ηsp/c) of 0.62 and 0.59, respectively, as measured in a 0.5 g/dl chloroform solution at 30° C.

Further, a propargyl group-substituted PPE-1 having an average substitution degree of 14% was prepared in the same manner as in Example 12. The obtained propargyl group-substituted PPE-1 had a viscosity number of 0.64 as measured in a 0.5 g/dl chloroform solution at 30° C.

Curable composite materials

Using the above-obtained curable PPE resins and various epoxy resins described below, different curable composite materials having the formulations shown in Table 13 were produced. As the components, the following materials were used.

Initiator:
2,5-dimethyl-2,5-di(t-butylperoxy)hexyne-3 (Perhexyne 25B, manufactured and sold by Nippon Oil & Fats Co., Ltd., Japan)

Epoxy resin:
(1) Bisphenol A glycidyl ether epoxy resin AER331 (manufactured and sold by Asahi Kasei Kogyo K.K., Japan; epoxy equivalent: 189),
(2) Low brominated bisphenol A glycidyl ether epoxy resin AER711 (manufactured and sold by Asahi Kasei Kogyo K.K., Japan; epoxy equivalent: 485, bromine content: 20% by weight),
(3) High brominated bisphenol A glycidyl ether epoxy resin DER542 (manufactured and sold by Dow Chemical, U.S.A.; epoxy equivalent: 320, bromine content: 48% by weight),
(4) Cresol novolak epoxy resin ECN273 (manufactured and sold by Asahi Kasei Kogyo K.K., Japan; epoxy equivalent: 220).

Curing agent and Accelerator:
DDM: 4,4'-diaminodiphenylmethane
2E4MZ: 2-methyl-4-methylimidazole
PN: phenol novolak (Plyophen LF-5337, OH equivalent: 153, manufactured and sold by Dainippon Ink & Chemicals, Inc., Japan)
MPDA: m-phenylenediamine
BDMA: benzylmethylamine
2MZ: 2-methylimidazole Fire retardant:
Decabromodiphenyl ether (AFR-1021, manufactured and sold by Asahi Glass Co., Ltd., Japan)

Auxiliary fire retardant:
$Sb_2O_3$ (PATOX-M, manufactured and sold by Nihon Seiko, Japan)

The above-mentioned components were dissolved or dispersed in trichloroethylene according to the formulation shown in Table 13 so that the resultant mixture had a viscosity of 60 to 70 cps. A glass cloth was dipped in the mixture to impregnate the mixture in the glass cloth, and dried at room temperature for 1 hour and, then, dried in an air oven at 100° C. for 30 minutes. As the glass cloth, a glass cloth of 48 $g/m^2$ was used in Examples 66 to 68, 70 and 72, and a glass cloth of 105 $g/m^2$ was used in Examples 65, 69 and 71.

The thus obtained curable composite materials had a smooth and nonsticky surface and, therefore, were excellent in handling properties.

Laminate structure 6 or 8 Sheets of each of the above-obtained curable composite material were piled up. Then, a copper foil having a thickness of 35 μm was disposed on each surface of the piled material, and subjected to press-molding by means of a pressing machine under a pressure of 40 $kg/cm^2$ while elevating the temperature from room temperature to 180° C. and maintaining 180° C. for 2 hours, and cooled. Thus, a laminate structure having a thickness of about 0.7 mm was obtained. The properties of the laminate structure were determined according to the methods described above. The results are shown in Table 14.

As apparent from Table 14, the laminate structures of Examples 65 to 68 comprising the epoxy resin in an amount larger than the curable PPE resin had excellent low dielectric properties as compared to those of the conventional laminate structure comprising an epoxy resin and a copper foil. That is, the laminate structures of Examples 65 to 68 had a dielectric constant as low as 3.6 to 3.8 and a dielectric dissipation factor as low as 0.008 to 0.015, whereas the conventional laminate structure generally had a dielectric constant (1 MHz) of 4.1 to 5.0 and a dielectric dissipation factor (1 MHz) as high as more than 0.015 to about 0.30.

On the other hand, the laminate structures of Examples 70 to 72 comprising the curable PPE resin in an amount larger than the epoxy resin showed excellent flow characteristics at molding the piled materials. Therefore, the laminate structures were molded under relatively low molding pressure. Further, the bonding strength of the copper foil layer to the resin composition layer of the laminate structure was excellent substantially without any decrease in dielectric properties.

TABLE 13

| | Curable PPE | | | | | | Formulation of resin composition (part by weight) | | | | | | | bromine content of resin composition (wt. %) (except bromine in a fire retardant) | Reinforcement | |
|---|---|---|---|---|---|---|---|---|---|---|---|---|---|---|---|---|
| | Substituent | Average substitution degree (%) | ηsp/c | Curable PPE | TAIC or TAC | Initiator[a] | AER 331 | AER 711 | DER 542 | ECN ·273 | Curing agent and accelerator | Decabromodiphenyl ether | $Sb_2O_3$ | | Type | wt. % |
| Example 65 | allyl | 14 | 0.62 | 20 | 5 (TAC) | 0.8 | 40 | 0 | 40 | 0 | DDM 6.8 2E4MZ 0.2 | 0 | 0 | 17.0 | glass cloth | 50 |
| Example 66 | allyl | 14 | 0.62 | 35 | 5 (TAIC) | 1.2 | 0 | 45 | 20 | 0 | 2E4MZ 2.6 | 0 | 0 | 17.1 | glass cloth | 40 |
| Example 67 | allyl | 14 | 0.62 | 35 | 5 (TAIC) | 1.2 | 0 | 65 | 0 | 0 | DDM 5.3 2E4MZ 0.13 | 0 | 2 | 11.6 | glass cloth | 45 |
| Example 68 | al- | 14 | 0.62 | 35 | 5 | 1.2 | 0 | 65 | 0 | 0 | PN 20 | 0 | 3 | 10.2 | glass | 30 |

TABLE 13-continued

| | Curable PPE | | | | | | | | | | | | | bromine content of resin composition (wt. %) | | |
|---|---|---|---|---|---|---|---|---|---|---|---|---|---|---|---|---|
| | | Average substitution degree (%) | $\eta sp/c$ | Curable PPE | TAIC or TAC | Initiator[a] | Epoxy resin | | | | Curing agent and accelerator | Decabromodiphenylether | $Sb_2O_3$ | (except bromine in a fire retardant) | Reinforcement | |
| | Substituent | | | | | | AER 331 | AER 711 | DER 542 | ECN 273 | | | | | Type | wt. % |
| Example 68 | allyl | | | | (TAIC) | | | | | | 2E4MZ 0.7 | | | | cloth | |
| Example 69 | allyl | 14 | 0.62 | 50 | 20 (TAC) | 2.1 | 0 | 0 | 0 | 50 | 2E4MZ 2.0 | 10 | 2 | 0 | glass cloth | 50 |
| Example 70 | allyl | 14 | 0.62 | 65 | 10 (TAIC) | 2.3 | 0 | 35 | 0 | 0 | 2E4MZ 0.7 | 0 | 2 | 6.2 | glass cloth | 45 |
| Example 71 | allyl | 7 | 0.59 | 65 | 10 (TAIC) | 2.3 | 0 | 35 | 0 | 0 | MPDA 1.8 BDMA 0.1 | 0 | 2 | 6.1 | glass cloth | 50 |
| Example 72 | propargyl | 14 | 0.64 | 80 | 20 (TAIC) | 3.0 | 0 | 0 | 20 | 0 | 2MZ 0.4 | 0 | 3 | 7.8 | glass cloth | 50 |

Note:
[a]As an initiator, 2,5-dimethyl-2,5-di(t-butylperoxy)hexyne-3 was used.

TABLE 14

| | Chloroform extractable PPE resin component content (%) | Fire retardance (UL-94) | Resistance to trichloroethylene | | Dielectric constant (1 MHz) | Dielectric dissipation factor (1 MHz) | Heat resistance[f] in solder bath (260° C., 120 sec.) | Copper foil-peel strength (kg/cm) |
|---|---|---|---|---|---|---|---|---|
| | | | Weight increase (%) | Appearance[e] | | | | |
| Example 65 | 1.0 | V-0 | 4.8 | o | 3.8 | 0.015 | o | 2.2 |
| Example 66 | 1.3 | V-0 | 4.6 | o | 3.6 | 0.011 | o | 2.1 |
| Example 67 | 1.1 | V-0 | 5.1 | o | 3.7 | 0.008 | o | 2.1 |
| Example 68 | 1.4 | V-0 | 2.1 | o | 3.7 | 0.010 | o | 2.1 |
| Example 69 | 1.7 | V-0 | 2.4 | o | 3.5 | 0.007 | o | 2.0 |
| Example 70 | 2.5 | V-0 | 5.0 | o | 3.5 | 0.005 | o | 2.0 |
| Example 71 | 2.1 | V-0 | 4.2 | o | 3.4 | 0.005 | o | 2.0 |
| Example 72 | 3.2 | V-0 | 3.0 | o | 3.2 | 0.004 | o | 2.0 |

Note:
[e]o: Appearance was not changed.
[f]o: Appearance was not changed.

EXAMPLE 73

Composite structure

A trichloroethylene solution having the same composition as that described in Example 66 was prepared and subjected to film casting, to thereby obtain a film of a curable PPE resin composition having a thickness of about 120 μm. The film had a smooth and nonsticky surface and, therefore, had excellent handling properties.

The film was dried in an air oven at 130° C. for 10 minutes and disposed on one surface of an aluminum plate having a thickness of 1.0 mm which had been subjected to surface treatment, i.e., abrasion, degreasing and etching. Then, a copper foil having a thickness of 35 μm was disposed on the other surface of the film, which surface was opposite to the surface facing the aluminum plate. The resultant material was subjected to press-molding by means of a pressing machine under a pressure of 40 kg/cm² at 180° C. for 2 hours, to thereby obtain a composite structure. The thermal resistivity of the composite structure measured according to the method described in Example 36, was 20° C./W. The above results show that the composite structure was excellent in heat dissipation.

EXAMPLE 74

A copper foil having a thickness of 18 μm was disposed on one surface of the curable composite material obtained in Example 70, and subjected to press-molding under a pressure of 40 kg/cm² at 180° C. for 2 hours, to thereby obtain a laminate structure.

The laminate structure had a copper foil-peel strength as high as 1.2 kg/cm or more and a water absorption as low as 0.1% or less. Further, the laminate structure had high flexural strength, ensuring that it can be suitably used as a semirigid printed circuit board in the field of electronics.

EXAMPLE 75

A trichloroethylene solution having the same composition as that described in Example 72 was prepared and subjected to film casting, to thereby obtain a film of a curable PPE resin composition having a thickness of about 110 μm. The film had a smooth and nonsticky surface and, therefore, had excellent handling properties.

The film was dried in an air oven at 100° C. for 30 minutes. Then, a copper foil having a thickness of 18 μm was disposed on each surface of the film and subjected to press-molding under a pressure of 40 kg/cm² at 180° C. for 2 hours, to thereby obtain a laminate structure.

The laminate structure had a copper foil-peel strength as high as 1.2 Kg/cm or more and a water absorption as low as 0.1 % or less. Further, the laminate structure had high flexural strength, ensuring that it can be suitably used as a semirigid board in the field of electronics.

What is claimed is:

1. A curable polyphenylene ether resin composition comprising:

(a) 98 to 40% by weight, based on the total weight of components (a) and (b), of a curable polyphenylene ether resin comprising at least one polyphenylene ether represented by the formula:

$$Q'+J-H]_m \qquad (I)$$

wherein m is an integer of 1 or 2, J is a polyphenylene ether chain comprising units of the formula:

$$\text{(II)}$$

wherein $R^1$, $R^2$, $R^3$ and $R^4$ each independently represent a hydrogen atom, an allyl group or a propargyl group, at least one of $R^1$, $R^2$, $R^3$, and $R^4$ being other than hydrogen, and Q' represents a hydrogen atom when m is 1, and Q' in each polyphenylene ether independently represents Q or Q substituted with at least one substituent selected from the group consisting of an allyl group and a propargyl group when m is 2, where Q is the residue of a bifunctional phenol having 2 phenolic hydroxyl groups and having unpolymerizable substituents at the ortho and para positions with respect to the phenolic hydroxyl groups, with the proviso that each polyphenylene ether chain is the same or different when m is 2 and that said units of formula (II) are the same or different, said curable polyphenylene ether resin having an average substitution degree of allyl and propargyl groups of from 0.1 to 100 % by mole as defined by the formula:

$$\frac{\text{total number of moles of allyl and propargyl groups in the polyphenylene ether resin}}{\text{number of moles of phenyl groups in the polyphenylene ether resin}} \times 100(\%);$$

(b) 2 to 60% by weight, based on the total weight of components (a) and (b), of at least one cyanurate selected from the group consisting of triallyl isocyanurate and triallyl cyanurate;

(c) 0 to 50% by weight, based on the total weight of components (a) and (b), of a fire retardant selected from the group consisting of a phosphorus-containing fire retardant, a chlorine-containing fire retardant and a bromine-containing fire retardant;

(d) 0 to 50% by weight, based on the total weight of components (a) and (b), of an antimony-containing auxiliary fire retardant; and (e) 0 to 90% by weight, based on the total weight of components (a), (b), (c), (d) and (e), of a reinforcement.

2. The curable polyphenylene ether resin composition according to claim 1, wherein the amount of each of components (c), (d) and (e) is zero.

3. The curable polyphenylene ether resin composition according to claim 1, wherein the amount of component (e) is from 5 to 90% by weight, based on the total weight of components (a), (b), (c), (d) and (e), and the amount of each of components (c) and (d) is zero.

4. The curable polyphenylene ether resin composition according to claim 1, wherein the amount of component (c) is from 1 to 50% by weight, based on the total weight of components (a) and (b), and the amount of component (e) is zero.

5. The curable polyphenylene ether resin composition according to claim 1, wherein the amounts of components (d) and (e) are, respectively, from 0.1 to 50% by weight, based on the total weight of components (a) and (b), and 5 to 90% by weight, based on the total weight of components (a), (b), (c), (d) and (e), and component (c) is a bromine-containing fire retardant and is present in an amount of from 1 to 50% by weight, based on the total weight of components (a) and (b), said bromine-containing fire retardant being represented by the formula

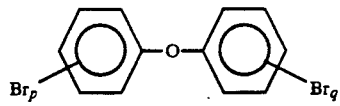

wherein each of p and q independently represents an integer of from 1 to 5 with the proviso that $4 \leq p+q \leq 10$.

6. The curable polyphenylene ether resin composition according to claim 1, wherein said curable polyphenylene ether resin has an average substitution degree of allyl and propargyl groups in the range of from 0.5 to 50% by mole.

* * * * *